US011110467B2

(12) United States Patent
Kimbell et al.

(10) Patent No.: US 11,110,467 B2
(45) Date of Patent: Sep. 7, 2021

(54) MATERIAL PROCESSING MACHINE WITH A COLORIZER SYSTEM AND METHODS OF REDUCING AND COLORIZING WASTE MATERIAL

(71) Applicant: Smoracy, LLC, Remus, MI (US)

(72) Inventors: Kyle Douglas Kimbell, Vestaburg, MI (US); Chad Dale Cross, Shepherd, MI (US)

(73) Assignee: Smoracy, LLC, Remus, MI (US)

( * ) Notice: Subject to any disclaimer, the term of this patent is extended or adjusted under 35 U.S.C. 154(b) by 298 days.

(21) Appl. No.: 15/892,763

(22) Filed: Feb. 9, 2018

(65) Prior Publication Data
US 2018/0229244 A1 Aug. 16, 2018

Related U.S. Application Data

(60) Provisional application No. 62/457,531, filed on Feb. 10, 2017.

(51) Int. Cl.
*B02C 23/18* (2006.01)
*B02C 18/14* (2006.01)
(Continued)

(52) U.S. Cl.
CPC ............ *B02C 23/18* (2013.01); *B02C 18/145* (2013.01); *B02C 18/18* (2013.01); *B02C 18/225* (2013.01);
(Continued)

(58) Field of Classification Search
CPC . B02C 18/225; B02C 21/02; B02C 2023/165; B02C 23/16; B02C 18/18; B02C 18/145; B02C 23/18
See application file for complete search history.

(56) References Cited

U.S. PATENT DOCUMENTS 135,656 A * 2/1873 Bradley et al. ......... B63B 13/00
114/185
3,129,739 A 4/1964 Wenger
(Continued)

OTHER PUBLICATIONS

Rotochopper B66T Coloring Demo (YouTube video published Oct. 20, 2014) (https://www.youtube.com/watch?v=0DmhvYCTjyc) (Year: 2014).*

(Continued)

*Primary Examiner* — Shelley M Self
*Assistant Examiner* — Fred C Hammers
(74) *Attorney, Agent, or Firm* — Howard & Howard Attorneys PLLC

(57) ABSTRACT

A material processing machine for material reducing operations. The material processing machine comprises an infeed system, a reducing system, and a discharge system. The reducing system comprises a rotor having processing tools to reduce the material within a reducing chamber. A colorizer system directs colorant from a colorant source towards the material reducing system within an outlet zone. The colorant colorizes the material being reduced within an inlet zone. The reduced material may be discharged through one or more screens within the outlet zone such that negligible colorant is applied directly to the reduced material. The material reducing operations may comprise a two-stage reducing operation in which the colorizer system is inoperable for the first stage and operable for the second stage. The screens may be selectively interchangeable between stages to incrementally reduce the material to provide substantially uniform colorizing and material size.

17 Claims, 13 Drawing Sheets

(51) Int. Cl.
*B02C 18/18* (2006.01)
*B02C 18/22* (2006.01)
*B02C 21/02* (2006.01)
*B02C 23/16* (2006.01)

(52) U.S. Cl.
CPC .............. *B02C 21/02* (2013.01); *B02C 23/16* (2013.01); *B02C 2023/165* (2013.01)

(56) References Cited

U.S. PATENT DOCUMENTS

| | | | |
|---|---|---|---|
| 3,254,687 A | 6/1966 | Tertyshnikov | |
| 4,245,999 A | 1/1981 | Reiniger | |
| 4,440,635 A | 4/1984 | Reiniger | |
| 4,794,022 A | 12/1988 | Johnson et al. | |
| 5,308,653 A | 5/1994 | Rondy | |
| 5,358,738 A | 10/1994 | Sawka | |
| 5,362,004 A | 11/1994 | Bateman | |
| 5,372,316 A | 12/1994 | Bateman | |
| 5,863,003 A | 1/1999 | Smith | |
| 5,975,443 A * | 11/1999 | Hundt | B02C 13/284 241/189.1 |
| 5,988,539 A | 11/1999 | Morey | |
| 6,000,642 A | 12/1999 | Morey | |
| 6,032,707 A | 3/2000 | Morey et al. | |
| 6,036,125 A | 3/2000 | Morey et al. | |
| 6,047,912 A | 4/2000 | Smith | |
| 6,059,210 A | 5/2000 | Smith | |
| 6,207,228 B1 * | 3/2001 | Hundt | B27N 1/00 118/303 |
| 6,299,082 B1 | 10/2001 | Smith | |
| 6,357,684 B1 | 3/2002 | Morey | |
| 6,422,789 B1 * | 7/2002 | Brewer | B09C 1/00 405/128.7 |
| 6,517,020 B1 | 2/2003 | Smith | |
| 6,722,596 B1 | 4/2004 | Morey | |
| 6,814,320 B1 | 11/2004 | Morey et al. | |
| 6,830,204 B1 | 12/2004 | Morey | |
| 6,845,931 B1 | 1/2005 | Smith | |
| 7,121,485 B2 | 10/2006 | Smith | |
| 7,163,166 B1 | 1/2007 | Smith | |
| 7,384,011 B1 | 6/2008 | Smith | |
| 7,726,594 B2 | 6/2010 | Smith | |
| 8,550,384 B2 * | 10/2013 | Nitta | A01F 29/005 241/18 |
| 9,604,227 B2 * | 3/2017 | Lieser | B02C 18/14 |
| 2008/0135656 A1 * | 6/2008 | Bradley et al. | B02C 23/18 241/101.6 |

OTHER PUBLICATIONS

Rotochopper B66T Coloring Demo (YouTube video published Oct. 20, 2014) (https://www.youtube.com/watch?v=0DmhvYCTjyc) (Year: 2014) (Year: 2014).*

* cited by examiner

MATERIAL PROCESSING MACHINE WITH A COLORIZER SYSTEM AND METHODS OF REDUCING AND COLORIZING WASTE MATERIAL

CROSS REFERENCE TO RELATED APPLICATIONS

The present application claims priority to and all the benefits of U.S. Provisional Patent Application No. 62/457,531, filed on Feb. 10, 2017, which is hereby expressly incorporated by reference in its entirety.

BACKGROUND

A variety of machines have been developed to chip, cut, grind, or otherwise reduce waste materials such as wood, brush, and green waste. Exemplary material processing machines include chippers (disk and drum types), hammer mills, hogs, shredders, forestry mulchers, and the like. The machines typically comprise material processing systems including an infeed system, a reducing system, and a discharge system. The infeed system directs the waste material to the reducing system and the material reducing system reduces the same, after which the reduced waste material is discharged via the discharge system.

One common use for the reduced waste material is landscaping. The benefits of mulching or applying green waste material to a landscape such as a yard or garden may include conserving soil moisture, maintaining uniform soil temperature, minimizing soil erosion and compaction, reducing weed problems, and altering the soil structure to increase root growth. The mulch may further provide a neater, more finished appearance to the flowerbed, garden or other landscape.

To further improve the aesthetics of the mulch, the color of the reduced waste material may be selectively changed. U.S. Pat. No. 3,254,687 to Tertyshnikov discloses introducing bleaching agents such as artificial urea, acid, and alkali solutions, which effectively lightens and even whitens processed livestock feed. The reference also discloses introducing additives such as molasses, which effectively darkens the feed material. Commercially available colorants typically include various shades of red and brown (including burgundy and cocoa), black, yellow, gold, cypress and orange. The form of the colorant may be liquid, granular, and powdered, or combinations thereof. The colorants may further provide mold and fungus protection as well as prevent discoloration caused by microbial attack.

In material processing applications applying colorant, improving the coverage of the colorant on the reduced waste material is an area of particular interest and development. U.S. Pat. No. 5,358,738 to Sawka discloses directly spraying the colorant onto the surfaces of the previously reduced wood chips. Likewise, a system produced by Rotochopper Inc. (Martin, Minn.), as disclosed in U.S. Pat. No. 6,207,228 to Hundt et al., applies the colorant directly to waste material before and after the waste material has been reduced by the reducing system. Spraying the colorant directly onto the material is deficient since at least some of the reduced waste material may not receive colorant. Particulate closest to the nozzles may receive relatively more colorant and/or obstruct the path of the colorant to remaining particulate, resulting in non-uniform application of the colorant. Further, the reduced waste material of the Rotochopper system has an opportunity to exit the reducing chamber prior to application of the colorant such that at least a portion of the material may not receive any colorant whatsoever. Therefore, a need in the art exists for systems and methods to produce material with uniformly-applied colorant.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
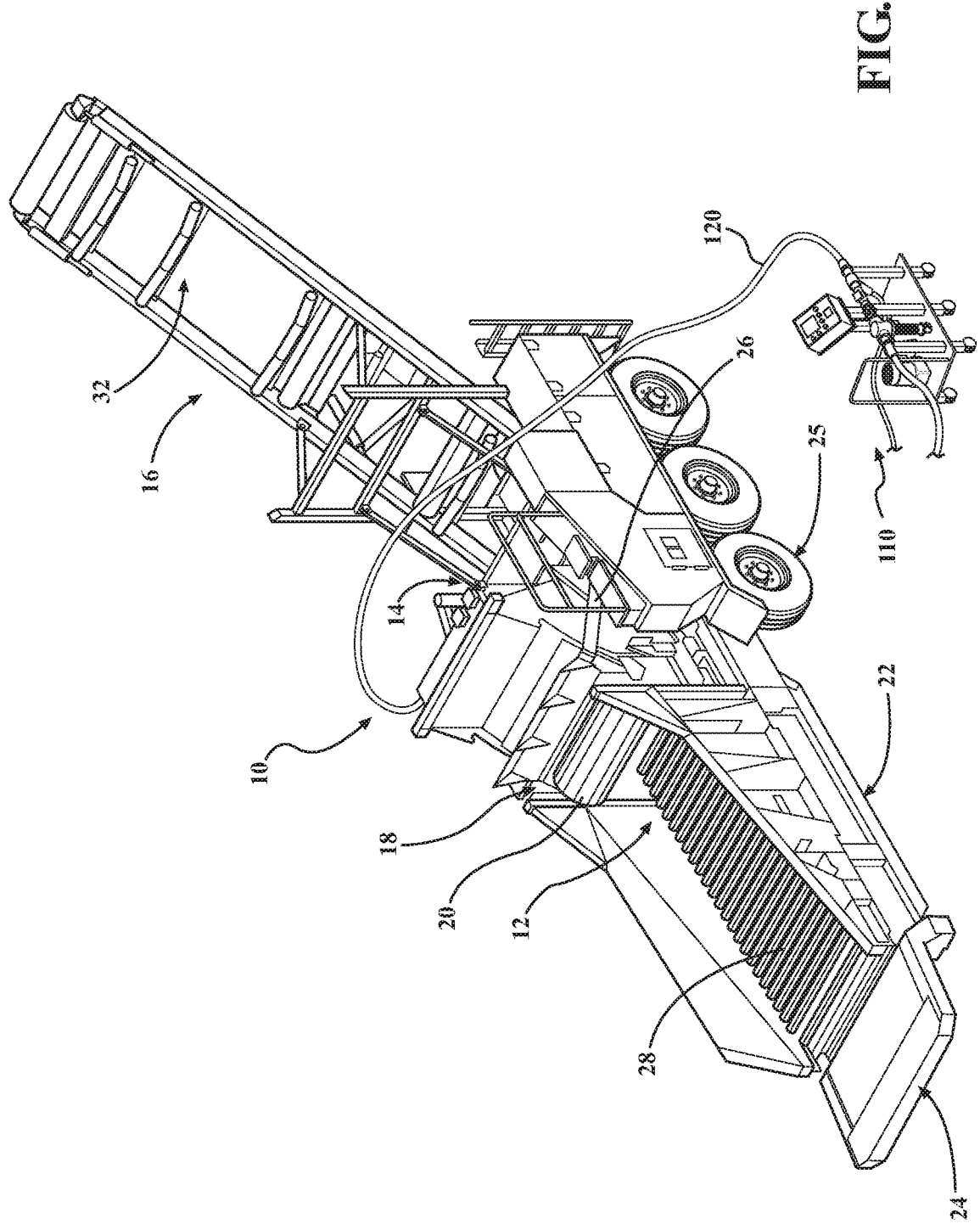
FIG. 1 is a perspective view of a material processing machine with a colorizer system in accordance with an exemplary embodiment of the present disclosure.
Figure 14:
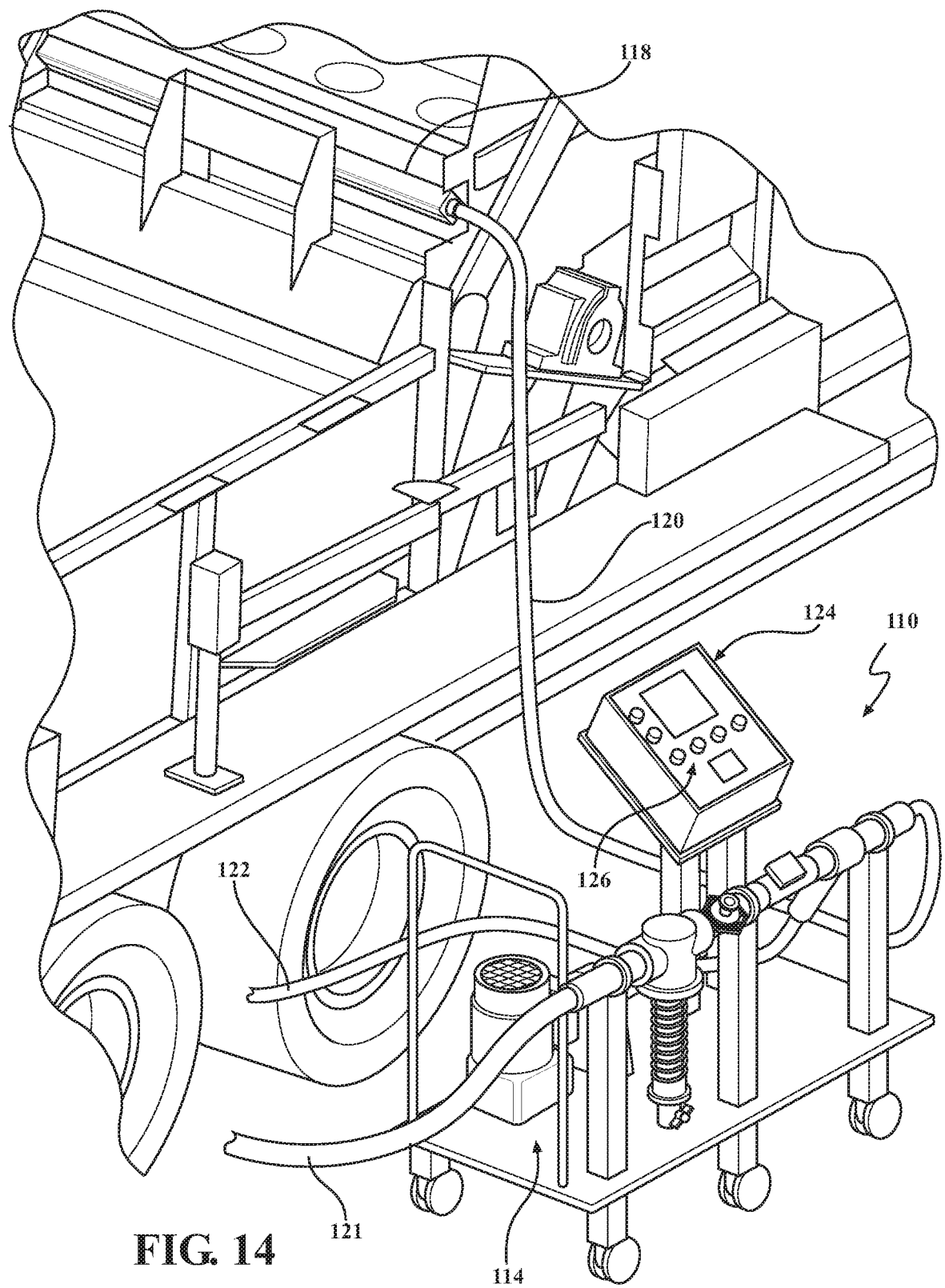
FIG. 14 is a perspective view of the colorizer system of FIG. 1 positioned near the material processing machine.

FIG. 1 illustrates an exemplary material processing machine 10 comprising an infeed system 12, a reducing system 14, and a discharge system 16. Waste material enters the material processing machine 10 through the infeed system 12 where it is directed to the reducing system 14. The reducing system 14 reduces the waste after which the discharge system 16 expels the waste from the material processing machine 10. A colorizer system 110 to be described may be positioned near and coupled to the material processing machine 10 with a line 120 to provide colorant to the waste being reduced with the reducing system 14 (a portion of the colorizer system 110 would typically be positioned near the machine 10 as illustrated in FIG. 14 such that the line 120 is not required to traverse the machine 10).

Certain aspects of the infeed system 12 and discharge system 16 are well known in the art and will only be described generally. For example, known aspects are at least partially described in detail in U.S. Pat. No. 5,362,004, issued Nov. 8, 1994, and U.S. Pat. No. 5,372,316, issued Dec. 13, 1994, which are incorporated by reference in their entireties. Referring to FIG. 1, the infeed system 12 comprises a feed wheel assembly 18. The feed wheel assembly 18 comprises one or more feed wheels 20 rotatably mounted to a suitable structure of the infeed system 12. The feed wheels 20 are configured to move the waste material to the reducing system 14. Subsequent to material reduction, the waste material is directed to the discharge system 16 and discharged from the material processing machine 10.

The material processing machine 10 is supported on a trailer frame 22 having a tongue mount 24 and wheels 25 at the front and rear of the frame 22, respectively. An exemplary frame 22 may comprise ¼" thick steel with 20" deep formed high tensile steel plating and cross-section bracing using continuous welds for structural integrity. The wheels 25 may be coupled to 25,000 pound air-brake axles. In another embodiment, the material processing machine 10 includes opposing tracks as an alternative to the wheels 25. In the exemplary embodiment illustrated in FIG. 1, the infeed system 12, the reducing system 14, and/or the discharge system 16 may be transported together on a singular frame 22. Alternatively, infeed system 12 and/or the discharge system 16 may be modular and transported separately from the reducing system 14.

The infeed system 12 comprises a feed conveyor 28 configured to receive the waste material proximate and direct the waste material towards the feed wheel 20. The feed conveyor 28 and the feed wheel 20 may cooperatively direct the material through an inlet opening 35 towards the reducing system 14. The feed wheel 20 may be internally driven and floating with a diameter of 24" and a width of 60". An exemplary feed conveyor 28 may comprise a double slat track-type design configured to direct material at twenty feet per minute. The feed conveyor 28 may comprise a length of 13 feet 6 inches and a width of 60 inches. Other dimensional and operating characteristics of the feed wheel 20 and the feed conveyor 28 are contemplated.

The discharge system 16 may comprise a discharge conveyor 30 illustrated in FIG. 1 (shown without the belt). In an exemplary embodiment, the discharge conveyor 30 may direct material at 280-460 feet per minute with an approximate stacking height of 12 feet 5 inches. The discharge conveyor 30 may comprise a length of 18 feet and a width of 4 feet. A hydraulic thrower (not shown) may be optionally mounted at the end of the discharge conveyor 30 and configured to load end-opening vehicles and/or broadcast the reduced material over a site. An exemplary hydraulic thrower may provide 25 degrees of side-to-side articulation, 34 degrees of upward articulation, and 12 degrees of downward articulation to control directional placement of the reduced waste material discharged from the discharge conveyor 30. In another exemplary embodiment, the discharge conveyor 30 may comprise a length of 27½ feet and a width of 4 feet. The discharge conveyor 32 may itself be articulable and provide 20-32 degrees of upward articulation to provide a maximum stacking height of 15 feet. In yet another example, a swinging or pivoting discharge system may comprise primary and secondary discharge segments articulable relative to one another. The secondary discharge pivots side-to-side 45 degrees with a maximum stacking height of 17 feet 6 inches. The primary and secondary discharge segments may provide for a "folded" configuration for storage, and extend to 30 feet in length. The system may further comprise a magnetic head pulley with support from an additional axle. The magnetic head pulley may be located at the end of the secondary discharge segment for retrieving metal fragments such as nails from the discharged waste material. The swinging or pivoting discharge system may be remotely controlled by radio remote controller.

Figure 2:
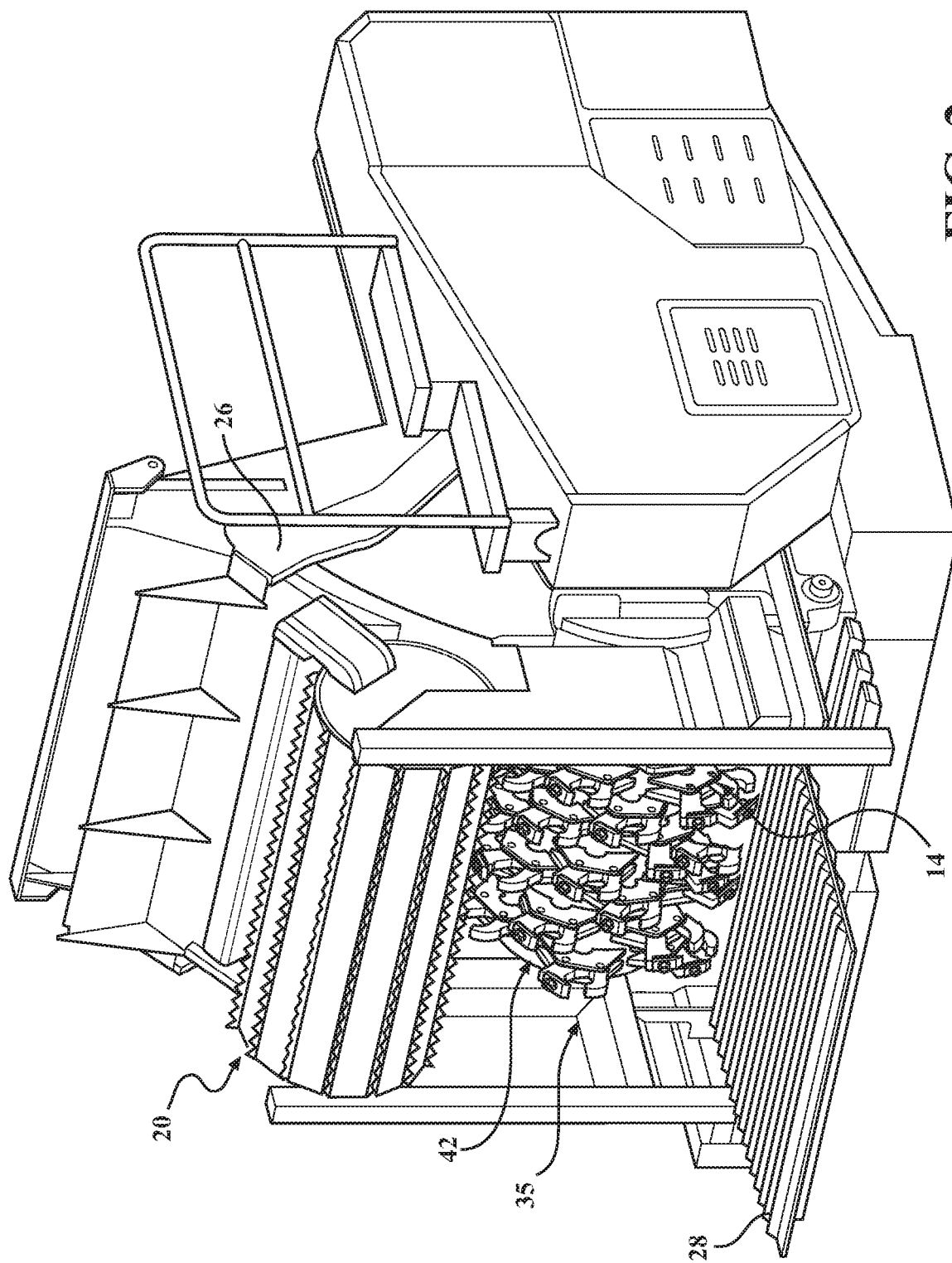
FIG. 2 is a partial perspective view of the material processing machine of FIG. 1 showing portions of an infeed system and a reducing system.

FIG. 2 is a partial perspective view of FIG. 1 illustrating portions of the infeed system 12 and the reducing system 14 supported by the frame 22 of the material processing machine 10. The feed wheel 20 of the infeed system 12 is rotatably mounted to the lower end of a pair of support arms 26 configured to raise and lower the feed wheel 20 with respect to the feed conveyor 28. The space between the feed conveyor 28 and the feed wheel 20 may generally define the inlet opening 35. FIG. 2 shows one of the support arms 26 (other not viewable) and the feed wheel 20 articulated or pivoted to a generally elevated position thereby providing a relatively larger inlet opening 35 of the infeed system 12. The support arms 26 may be articulated or pivoted to the generally elevated position for inspecting the reducing system 14, for storing the waste processing machine 10, or for accommodating relatively larger material such as a tree trunk. The articulation of the support arms 26 is selectively controlled to position the feed wheel 20 at a desired elevation relative to the feed conveyor 28 to control the size of the inlet opening 35. The articulation may be powered by hydraulic cylinders (not shown) adapted to permit an operator to raise the feed wheel 20 with respect to the feed conveyor 28 through means well understood in the art. The hydraulic cylinders may provide for automatic leveling of the feed wheel 20 if it begins to bind as a result of misalignment of the feed wheel 20 relative to the feed conveyor 28.

One or more motors (not shown) operably power the feed conveyor 28 in a generally clockwise direction to move the waste material disposed thereon towards the reducing system 14. The reducing system 14 comprises a reducing chamber 40 generally defined as an area of the material processing machine 10 within which material is reduced. In the exemplary embodiment illustrated in FIG. 3, the reducing chamber 40 is a partially cylindrical area housing a material reducing system 42 described herein.

Figure 3:
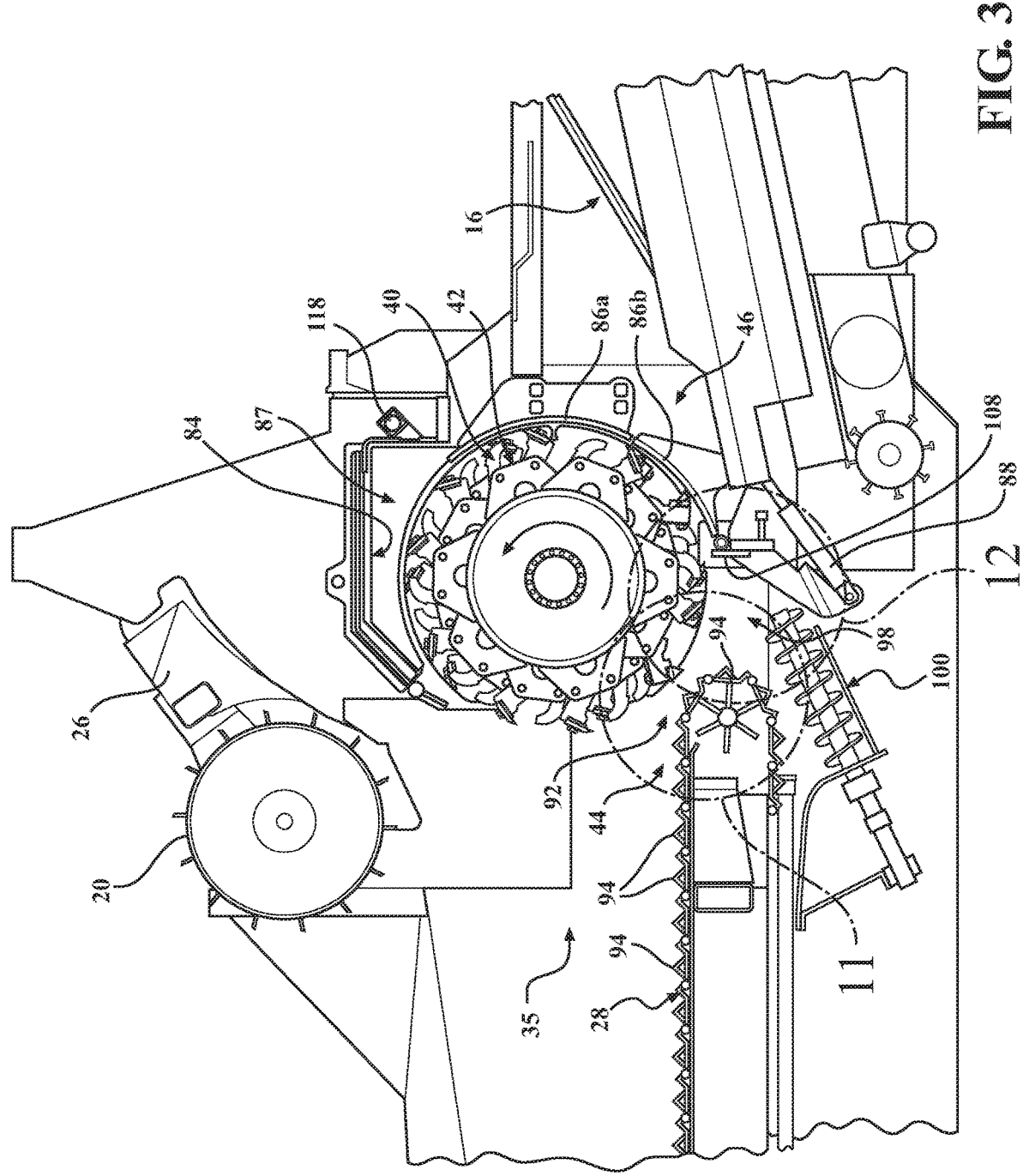
FIG. 3 is a partial cross sectional view of the material processing machine of FIG. 1.
Figure 4:
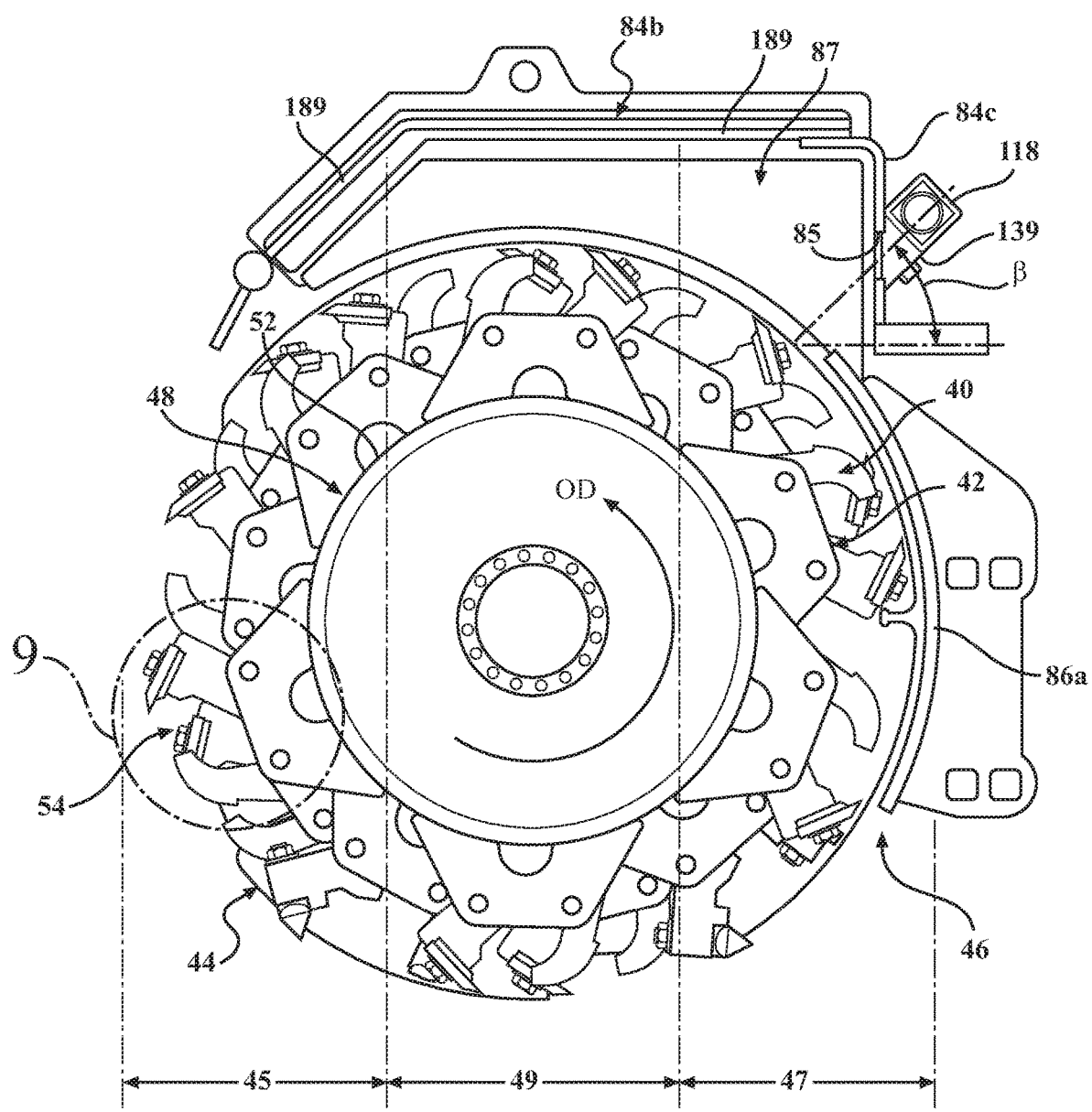
FIG. 4 is cross sectional side elevation view of a reducing chamber of the material processing machine of FIG. 1.

Referring to FIGS. 3 and 4, the reducing chamber 40 comprises an inlet area 44 and an outlet area 46. The inlet area 44 is generally defined as the area or opening through which the waste material enters the reducing chamber 40 from the infeed system 12. The inlet area 44 of the reducing chamber 40 generally corresponds to the inlet opening 35 of the infeed system 11 such that waste material directed into the inlet opening 35 is further directed into the inlet area 44. Stated differently, the reducing chamber 40 may comprise an inlet zone 45, an outlet zone 47, and a transition zone 49 intermediate the inlet zone 45 and the outlet zone 47. FIG. 4 illustrates the inlet, outlet, and transition zones 45, 47, 49. The inlet zone 45 may comprise the inlet area 44, and the outlet zone 47 may comprise the outlet area 46. The functionality of the zones and areas as it relates to the material reducing system 42 and the colorizer system 110 will be described in detail below.

Figure 6:
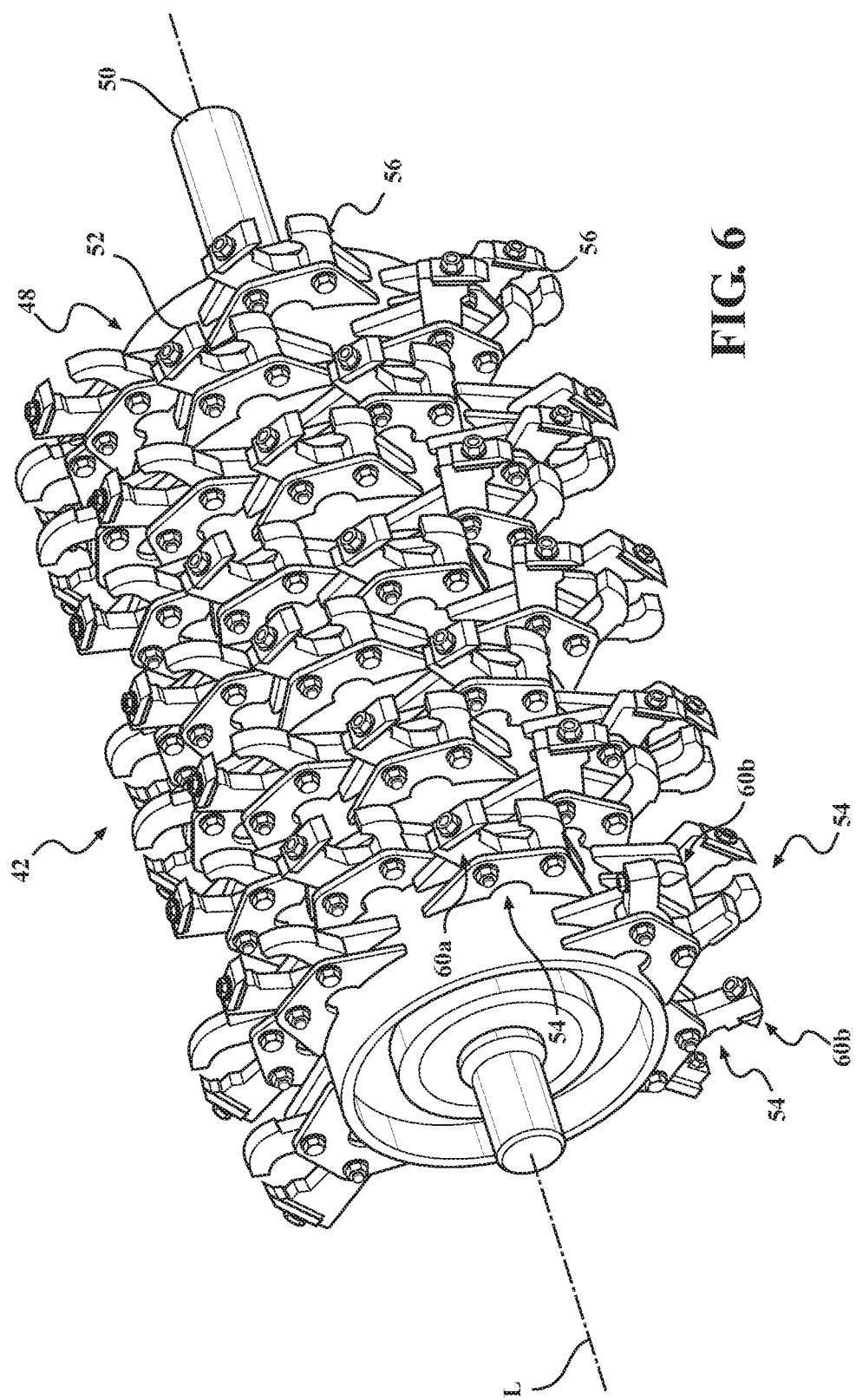
FIG. 6 is a perspective view of a material reducing system in accordance with an exemplary embodiment of the present disclosure.

An exemplary material reducing system 42 will now be described with reference to FIG. 6. The material reducing system 42 comprises a rotor 48 having a shaft 50 rotatably mounted at its ends about longitudinal axis L. The rotor 48 is coupled to the frame 22. The rotor 48 has a drum defining an outer surface 52 coaxially disposed with the shaft 50. An exemplary drum may comprise a diameter of 48 inches and a width of 63 inches. For material processing machines 10 with more demanding operating conditions, the drum may comprise a larger diameter and be of a greater or lesser width. A motor is connected to the shaft 50 in a well-known manner and adapted to turn the shaft 50 and the rotor 48 in an operation direction OD (FIG. 4), or the direction in which the rotor 48 and shaft 50 rotates.

The rotor 48 has a plurality of processing tool assemblies 54 extending outwardly from the outer surface 52. The processing tool assemblies 54 each comprise a tool holder 56 configured to be fixedly mounted on the outer surface 52 of the drum, and a processing tool 60 coupled to the tool holder 56. The material reducing system 42 may comprise forty-two, fifty-four, sixty, seventy-two, or any number of processing tool assemblies 54.

Figure 7A:
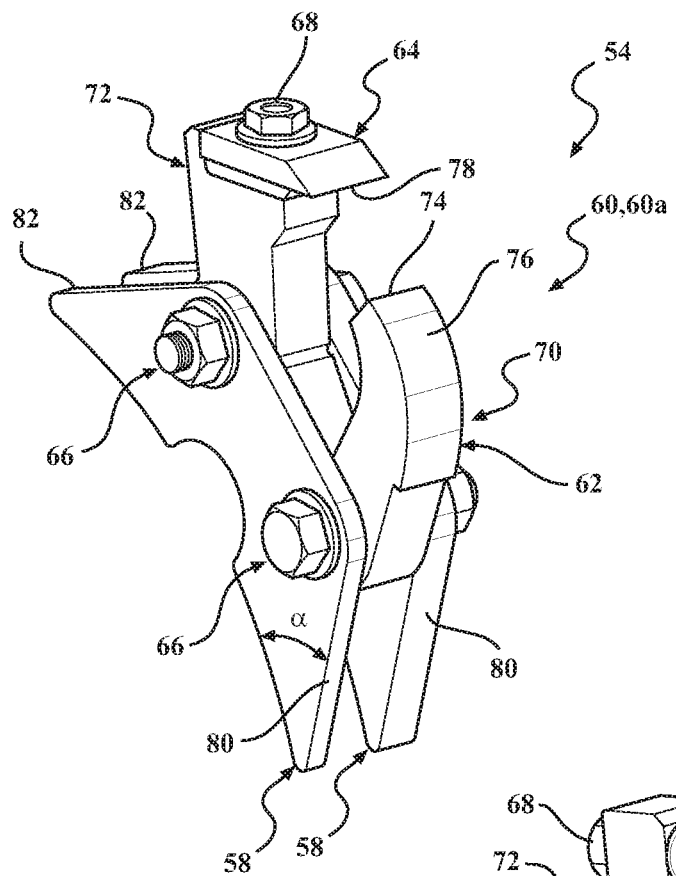
FIG. 7A is a perspective view of a processing tool system in accordance with an exemplary embodiment of the present disclosure.
Figure 7B:
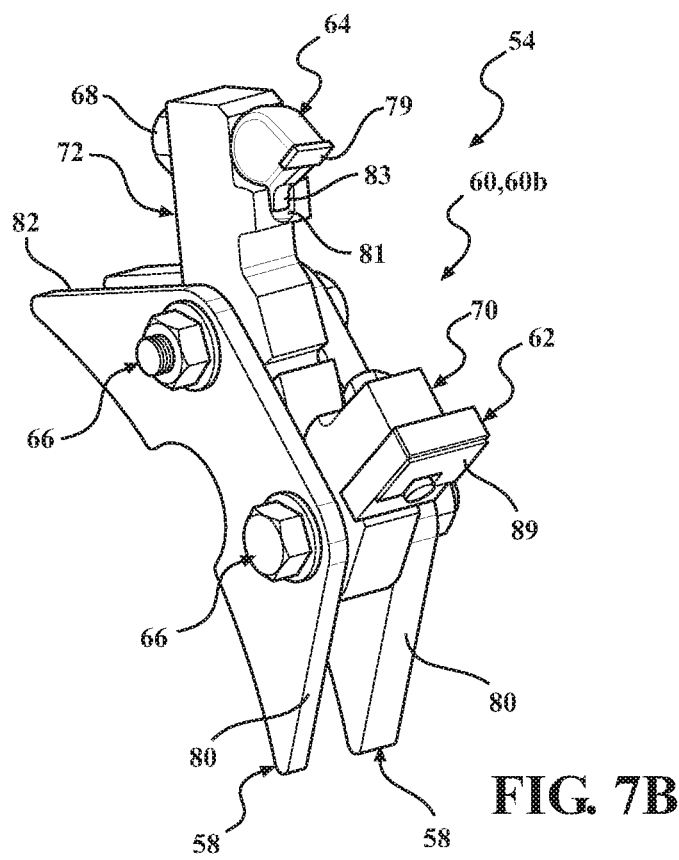
FIG. 7B is a perspective view of a processing tool system in accordance with another exemplary embodiment of the present disclosure.

An exemplary processing tool assembly 54 is shown in FIGS. 7A and 7B. Each tool holder 56 may comprise a plurality of spaced arm pairs 58 securing the processing tool 60 that cuts, splits, chops, chips, grinds, or any combination thereof, to reduce the waste material provided to the reducing system 14 by the infeed system 12. For example, the processing tool 60 may include a cuttermill 60*a* that positions and reduces the material through a decisive splitting action similar to an axe. In an embodiment, the processing tools 60 comprising cuttermills may be associated with less vibration, less fuel consumption, and more structural integrity than machines with comparatively more weight and horsepower. Another exemplary processing tool 60 includes a grinder 60*b* that reduces the material in a manner similar to a hatchet or axe. In many operations, only one type of processing tool assembly 54 (e.g., grinders 60*b*) is incorporated. As illustrated in FIG. 6, the present disclosure contemplates that more than one type of processing tools 60 may be incorporated to produce uniform or non-uniform material with consistent or varying sizes. It is further contemplated the rotor 48 may be arranged in a drum-type material reducing system (i.e., a "drum chipper").

The spaced arm pairs 58 are preferably mounted so that in one rotation of the rotor 48, every point on an imaginary axial line segment along the rotor 48 is contacted by the processing tools 60 mounted to the spaced arm pairs 58 of the tool holder 56. The present disclosure contemplates that the processing tool assemblies 54 may be arranged on the outer surface 52 in any number of desired configurations. For example, the processing tool assemblies 54 may be arranged in a generally spiral configuration between the opposing ends of the drum. Among other advantages, the spiral configuration may similarly optimize coverage of the processing tool assemblies 54 about the drum to limit abrasion of the material on the drum and promote a smoother, shaving-style cutting operation. Further, the spiral configuration may urge the reduced material towards a center (i.e., generally intermediate the opposing ends) of the drum to concentrate the processed material. Directing the reduced material towards the center may improve operations such as mulching and prevent debris from encroaching on bearings of the shaft 50. The processing tool assemblies 54 may be arranged in any advantageous manner based on the application or otherwise.

The material reducing system 42, and more specifically the processing tool assemblies 54, comprise the processing tools 60 removably coupled to the tool holder 56 with one or more fasteners 66. The fastener 66 may comprise a standard Hex bolt and nut commonly known in the art to facilitate easier service and replacement. The fasteners 66 may prevent movement of the tool body 62 relative to the tool holder 48 during operation of the rotor 48. Other variations of the processing tool assemblies 54 are contemplated, including those disclosed in commonly owned U.S. Pat. No. 6,299,082 to Smith, filed on May 1, 1998, which is herein incorporated by reference in its entirety.

With continued reference to FIGS. 7A and 7B, the processing tool 60 comprises a tool body 62 and a reducing member 64 coupled to the tool body 62. The tool body 62 may comprise a leading member 70 and a trailing member 72. The leading member 70 is generally oriented towards the operating direction OD (FIG. 4). The trailing member 72 is generally oriented a direction opposite the leading member 70 or away from the operating direction OD as shown in FIG. 7. The leading member 70 and the trailing member 72 may be unitary or monolithic in construction. Alternatively, one or more of the leading member 70 and the trailing member 72 may be discrete structures coupled to one another to comprise the tool body 62. In the exemplary embodiment illustrated in FIGS. 7A and 7B, each of the leading member 70 and the trailing member 72 is an elongate, arm-like structure generally extending angularly upward from the tool holder 56.

The reducing member 64 may be coupled to the trailing member 72 as illustrated in FIGS. 7A and 7B. FIG. 7A shows the reducing member 64 generally positioned in mating abutment atop the trailing member 72 and secured with the additional fastener 68 as illustrated. The embodiment illustrated in FIG. 7B shows the trailing member 72 comprising an aperture within which a shaft 187 (shown in FIGS. 8A-8D) of the reducing member 64 is positioned. A head 89 of the reducing member 64 extends from the trailing member 72 in the operation direction OD. The trailing member 72 may comprise a slot 81 configured to receive a counterposing protrusion 83 extending radially from the tooth-shaped reducing member 64. The engagement of the protrusion 83 within the slot 81 prevents rotation of the reducing member 64 within the trailing member 72 of the tool body 60.

The leading member 70 of the tool body 62 acts as a depth guide to limit the area of a reducing member 64 of the tool body 60 exposed to the waste product being processed. An upper edge 74 of the leading member 70 extends from the tool holder 56 at a distance less than the reducing member 64. The difference in the distances defines a contact area or portion of the reducing member 64 that contacts the waste material being processed. In one exemplary embodiment, the distance is approximately one-half inch, and preferably less than one inch to promote efficient operation (e.g., lesser power requirements, reduced wedging or binding, etc.). However, the distance comprising the depth guide can be increased or decreased depending upon the material being processed and/or any other number of desired operating characteristics.

FIG. 7A shows the leading member 70 comprising an arcuate portion 76 proximate the upper edge 74. The arcuate portion 76 is generally oriented towards the reducing member 64. In one exemplary embodiment, a tangent to the arcuate portion 76 at the upper edge 74 is collinear with the reducing edge 78 of the reducing member 64. The arcuate portion 76 is configured to direct the material towards the reducing edge 78. The arcuate portion 76 further limits the waste material contacting the trailing member 72 that may detrimentally affect operation. The exemplary embodiment of FIG. 7B includes a leading impact member 91. The leading impact member 91 may be fabricated, at least in part, from carbide. The leading impact member 91 may facilitate reduction of material and/or minimize irreducible material from impacting the reducing member 64.

In many respects, the reducing member 64 is the primary component of the processing tool assembly 54 that directly reduces the waste material. The reducing member 64 is fabricated from suitable material and in a suitable shape so as to chip, cut, grind, shred, pulverize or otherwise reduce the material. Those having skill in the art readily appreciate the reducing member 64 is typically fabricated, at least in part, from carbide to meet the demands of the reducing operation; however other sufficiently hard and/or hardened materials are contemplated. An additional fastener 68 may couple the reducing member 64 and the tool body.

The cutter 60a embodiment of the reducing member 64 illustrated in FIG. 7A comprises a plate-shaped structure tapering to a leading edge 78 that reduces the material through a decisive splitting action. The reducing member 64 of the grinder 60b illustrated in FIG. 7B comprises a tooth-shaped structure with an impact face 79 that reduces the material through a violent impact action.

FIGS. 8A-8D illustrate embodiments of the reducing member 64 configured to removably couple to the tool body 60 of FIG. 7B. Each of the reducing members 64 comprise the shaft 187 and the head 89. Typically the shaft 187 and the head 89 are unitary or monolithic in construction. The leading face 79 is secured to the head 89 through welding, brazing or other similar means commonly known in the art. The protrusion 83 previously described extends radially from the head 89 as illustrated.

Figure 8A:
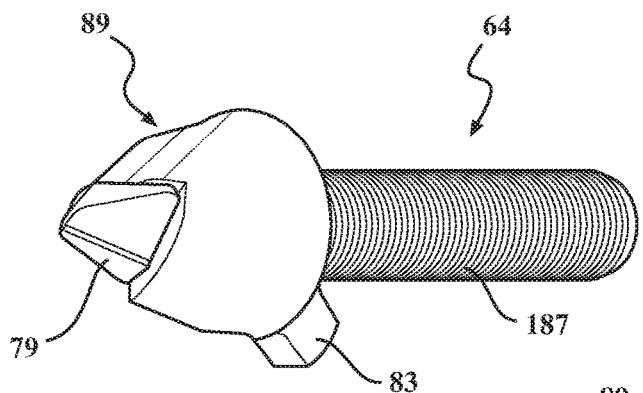
FIG. 8A is a perspective view of a reducing member in accordance with an exemplary embodiment of the present disclosure.
Figure 8B:
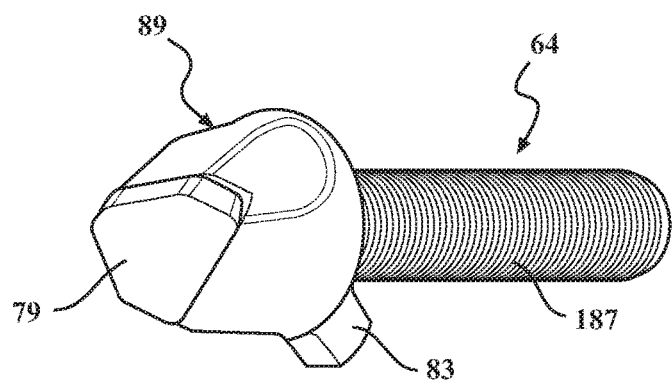
FIG. 8B is a perspective view of a reducing member in accordance with another exemplary embodiment of the present disclosure.
Figure 8C:
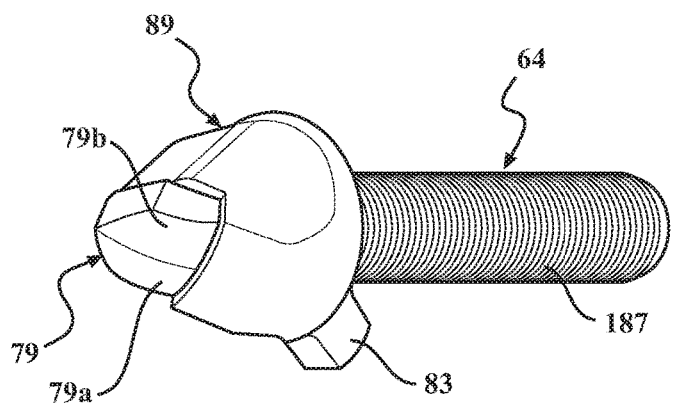
FIG. 8C is a perspective view of a reducing member in accordance with another exemplary embodiment of the present disclosure.
Figure 8D:
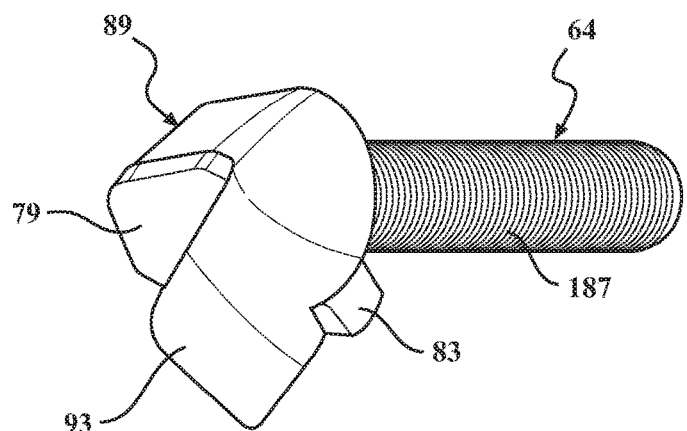
FIG. 8D is a perspective view of a reducing member in accordance with another exemplary embodiment of the present disclosure.

The design of the reducing members 64 of FIGS. 7B and 8A-8D, and more particularly the impact face 79, provides characteristics unique to each reducing member 64. Selection of the suitable reducing member 64, typically based on the reducing operation, maximizes efficiency of the reducing operation. FIG. 8A shows a "splitter tooth" grinder used in many applications, particularly land clearing operations. The splitter tooth may be used with carbide cutters, butcher teeth, or G55 grinding teeth. FIG. 8B shows a "shingle tooth" grinder with a thicker carbide impact face 79. The shingle tooth is durable and particularly effective in reducing shingles and grinding typical green waste. FIG. 8C shows a "helmet head tooth" grinder with a rounded-shaped impact face 79 that is split into two sub-faces 79a, 79b angularly oriented relative to one another. The helmet head tooth is particularly effective in reducing pallets and construction waste as well as light green waste, logging slash, and sawmill waste. FIG. 8D shows a "butcher fan tooth" grinder with a wider impact face 79. The butcher fan tooth also comprises a fan blade 93 forced with the head 89 of the reducing member 64. The fan blade 93 increases fluid forces within the reducing chamber 40, particularly at the boundary, as described in detail throughout the present disclosure. The aforementioned reducing members 64 provide modularity for reducing material to a desired consistency, including bio-sawdust, plastic pallets, compost, conventional chips, cedar mulch, land clearing waste, and pallet waste, among others.

Returning to the tool holder 56 illustrated in FIGS. 7A and 7B, and more particularly each of the arm pairs 58, may comprise an angled leading edge 80 and/or an angled trailing edge 82. Each of the arm pairs 58 comprising the angled leading edge 80 and the angled trailing edge 82 may define a generally trapezoidal tool holder 56 when viewed in elevation. The angled leading edge 80 is preferably provided at an acute angle, a. The angle, a, may be between 25 and 75 degrees, or more particularly between 35 and 65 degrees. The angled leading edge 80 directs the material towards the leading member 70 of the processing tool 60, thereby reducing wear on the tool holder 56 and improving efficiency.

Figure 5:
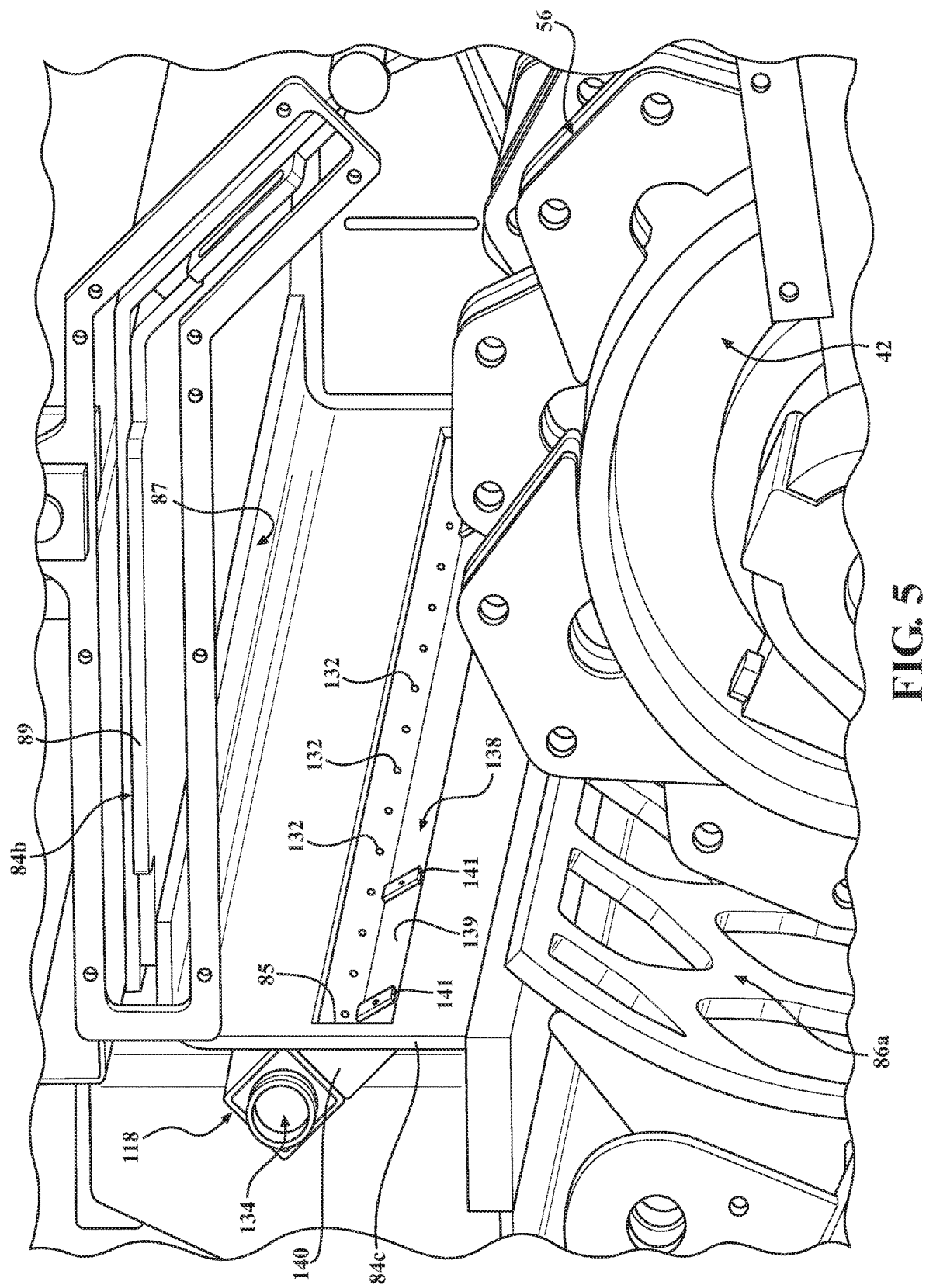
FIG. 5 is a partial perspective view of the reducing chamber of FIG. 4.
Figure 9:
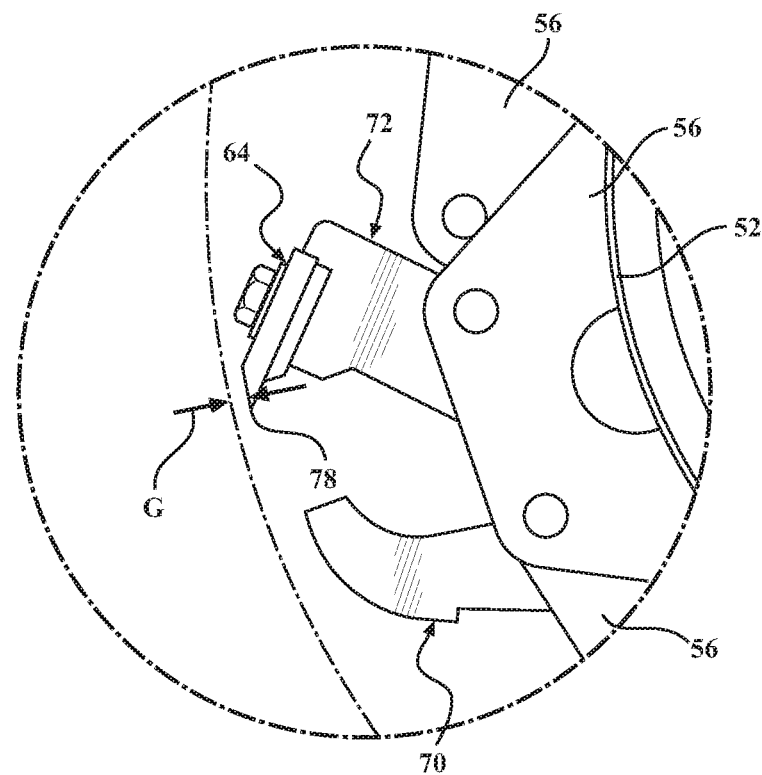
FIG. 9 is a detailed view of section 9 of FIG. 4.

Now returning to the reducing chamber 40 illustrated in FIGS. 3-5, the reducing system 14 comprises a housing 84 and one or more screens 86a, 86b that at least partially encircle the rotor 48 and define a boundary of the reducing chamber 40. The housing 84 may include barriers 84b, 84c and/or the screen(s) 86a, 86b may be arcuate (e.g., the screens 86a, 86b of FIG. 3) with a radius of curvature approximate the rotor 48 such that at least a portion of the reducing chamber 40 is substantially coaxial to the rotor 48 when viewed in elevation (e.g., the detailed view of FIG. 9 shows the reducing member 64, including the reducing edge 78, separated from the radius of curvature (broken line) by a gap G). The present disclosure contemplates that the gap G may be selectively adjustable based on the size and/or type of processing tool assemblies 54 coupled to the rotor 48. Only a portion of the processing tool assemblies 54 are shown assembled in the figures, and it should be appreciated that the gap G generally extends about the rotor 48.

The housing 84 may define other characteristics of the reducing chamber 40, such as side barriers. For another example, barriers 84 b, 84 c of the housing 84 generally define an upper recess 87 within the reducing chamber 40. The upper recess 87 may be positioned intermediate the inlet area 44 and the outlet area 46, and more particularly within the transition zone 49 and/or the outlet zone 47 as illustrated in FIG. 4. The upper recess 87 is configured to provide an area of clearance between the processing tool assemblies 54 and the boundary of the reducing chamber 40. Based on the relatively narrow gap G about the rotor 48 at certain points within the reducing chamber 40, and the reducing member 64 of the processing tool assemblies 54, the forces provided by the laminar flow at the boundary caused by centripetal fluid forces are typically significant. The unreduced, partially reduced and fully reduced material similarly occupies the gap G between the inlet area 44 and the outlet area 46. The clearance provided by the upper recess 87 allows expansion of the fluid (e.g., air) within the reducing chamber 40 to minimize a throttling effect at the boundary within the gap G. The clearance may also reduce wear from any material and/or non-reducible objects (e.g., a rock or other hard debris) moving about the boundary in the operation direction OD by limiting the contact between the same. The upper recess 87 provides the area of clearance for non-reducible objects to be temporarily deposited before being directed in the operating indirection OD to the inlet zone 45. Due to potential wear proximate the upper recess 87, one or more of the barriers 84 b, 84 c may be removably secured to provide ease of replacement. For example, the barrier 84 b may define a "roof" comprising one or more slats 189 configured to be slidably removed and installed. The slats 189 may be supported at its ends or secured with fasteners as commonly known in the art. Lastly, the upper recess 87 may further provide relief from larger obstructions within the reducing chamber 40 to maintain efficient operation of the reducing system 14.

The boundary of the reducing chamber 40 is at least partially comprised of the screens 86a, 86b. Referring to FIGS. 3 and 4, the screens 86a, 86b are generally positioned within outlet zone 47 and separate the reducing chamber 40 from the discharge system 16. The screens 86a, 86b may be arcuate and substantially concentric with the rotor 48. In an exemplary embodiment, the screens 86a, 86b are separated from the processing tool assemblies 54 by the gap G. The gap G is preferably small such that the potential for the screens 86a, 86b to facilitate further reduction of the material is insignificant. Stated differently, an insignificant amount of material is further reduced by edges of the openings of the screens 86a, 86b. Rather, the primary function of the screens 86a, 86b is to permit the waste material to exit the reducing chamber 40 once sufficiently reduced.

In an exemplary embodiment, the screens 86a, 86b comprise a movable screen 86b and a fixed screen 86a. Referring to FIG. 3, the fixed screen 86a is positioned above the movable screen 86b, but the reverse configuration is contemplated. The movable screen 86b is pivotally mounted and may be pivoted with one or more hydraulic cylinders 88. In an event that a non-reducible object becomes entrapped within the reducing system 14, the hydraulic cylinders 88 pivot the screen 86b downwardly, thereby creating an opening spanning substantially the width of the rotor 48. Should this be done while the rotor 48 continues to operate, the non-reducible may eject automatically through the opening. Alternatively, the rotor 48 may be powered down and the non-reducible object manually removed from the reducing chamber 40 via the opening. In the former instance, an advantage of the movable screen 86b permits clearing of non-reducible material from the reducing chamber 40 without stopping operation of the rotor 48.

Figure 10:
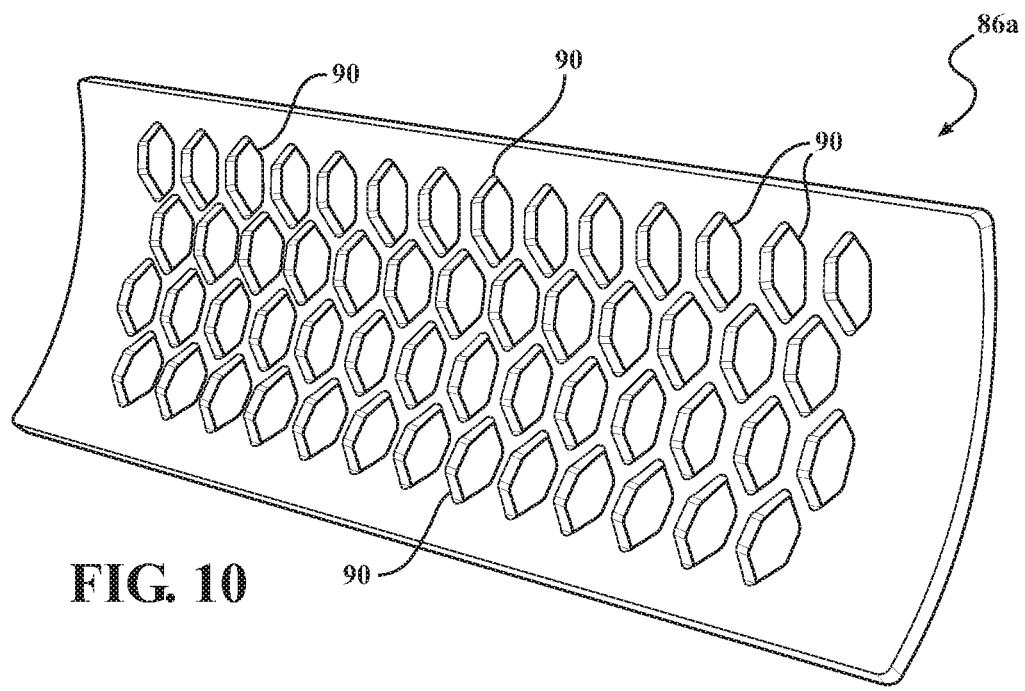
FIG. 10 is a perspective view of a screen in accordance with an exemplary embodiment of the present disclosure.

An exemplary fixed screen 86a is shown in FIG. 10. The fixed screen 86a is rectangular and comprises a width generally spanning the width of the reducing chamber 40. A plurality of openings 90 extend through the fixed screen 86a. The openings 90 may be arranged in any suitable manner. In the illustrated embodiment of FIG. 10, the openings 90 are arranged in a honeycomb-like manner with each of the openings 90 comprising a hexagon. Other contemplated shapes for the openings 90 include squares, circles, diamonds, and baffles. The openings 90 may comprise a diameter ranging from ⅝ inch to 7 inches in diameter and/or comprise gates up to 5 inches in diameter. Furthermore, while the fixed screen 86a is rigidly secured during operation, the fixed screen 86a is removable and selectively replaceable with another fixed screen 86a having the same or different characteristics (i.e., opening shape, size, arrangement, etc.), which will be described in detail below.

Figure 11:
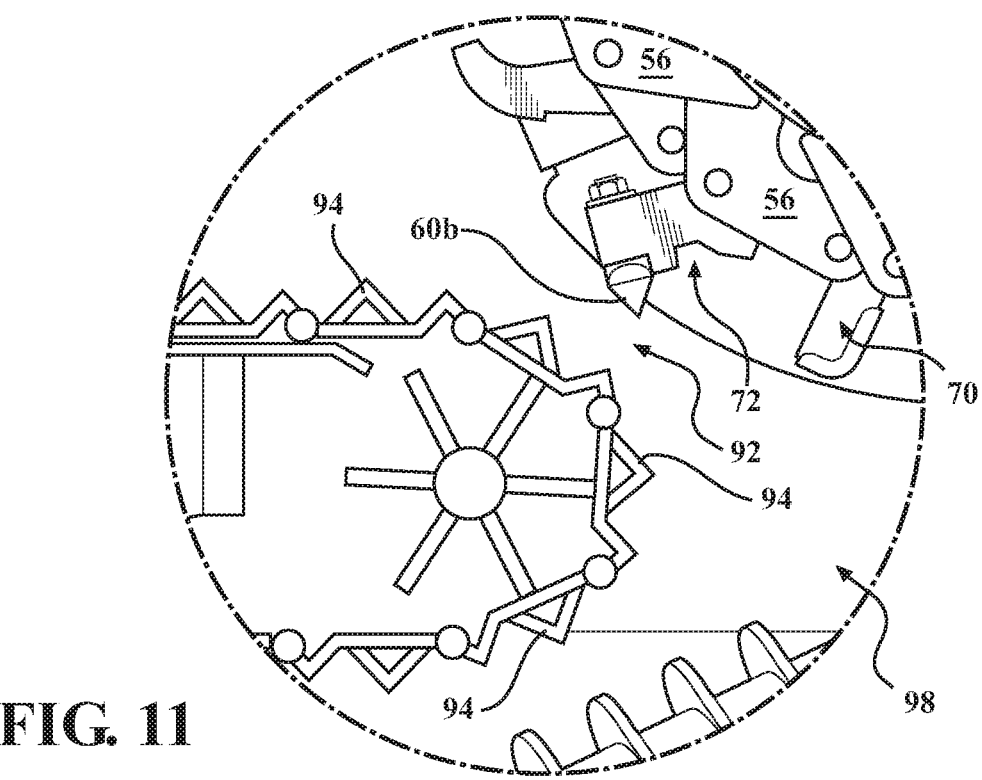
FIG. 11 is a detailed view of section 11 of FIG. 3.

Reducing operations of the waste processing machine 10 will now be discussed. As previously described, the feed conveyor 28 operates in a generally clockwise direction to direct the waste material disposed thereon towards the reducing chamber 40. The feed wheel 20 may further facilitate with such directing. The material passes through the inlet opening 35 of the infeed system 12 and the inlet area 44 of the reducing chamber 40. Referring now to FIGS. 3, 4, and 11, the waste material reaches a terminal end 92 of the feed conveyor 28. As mentioned, the feed conveyor 28 is a track comprised of slats 94. The slats 94 are designed to withstand the demands of the reducing operation. In one example, each of the slats 94 comprises a hardened upper portion of carbide, steel, or other suitably hard and durable material.

The terminal end 92 of the feed conveyor 28 is positioned sufficiently proximate to the path of the processing tool assemblies 54 of the rotor 48 such that the material is reduced by the processing tool assemblies 54 against the slats 94, thereby further defining the material reducing system 42. In other words, the material reducing system 42 includes the portion of the slats 94 that interface with the processing tool assemblies 54 of the rotor 48. With particular reference to FIGS. 3 and 11, the waste material is reduced effectively contemporaneous with "leaving" the feed conveyor 28. Reducing the material directly against the slats 94 eliminates the need for an anvil commonly known in the art, and advantageously eliminates any area or volume between the feed conveyor 28 and such an anvil for material to collect and wedge. FIG. 4 generally shows that the material reduction first occurs in the inlet zone 45 with the rotor 48 having the counterclockwise operating direction OD.

Figure 12:
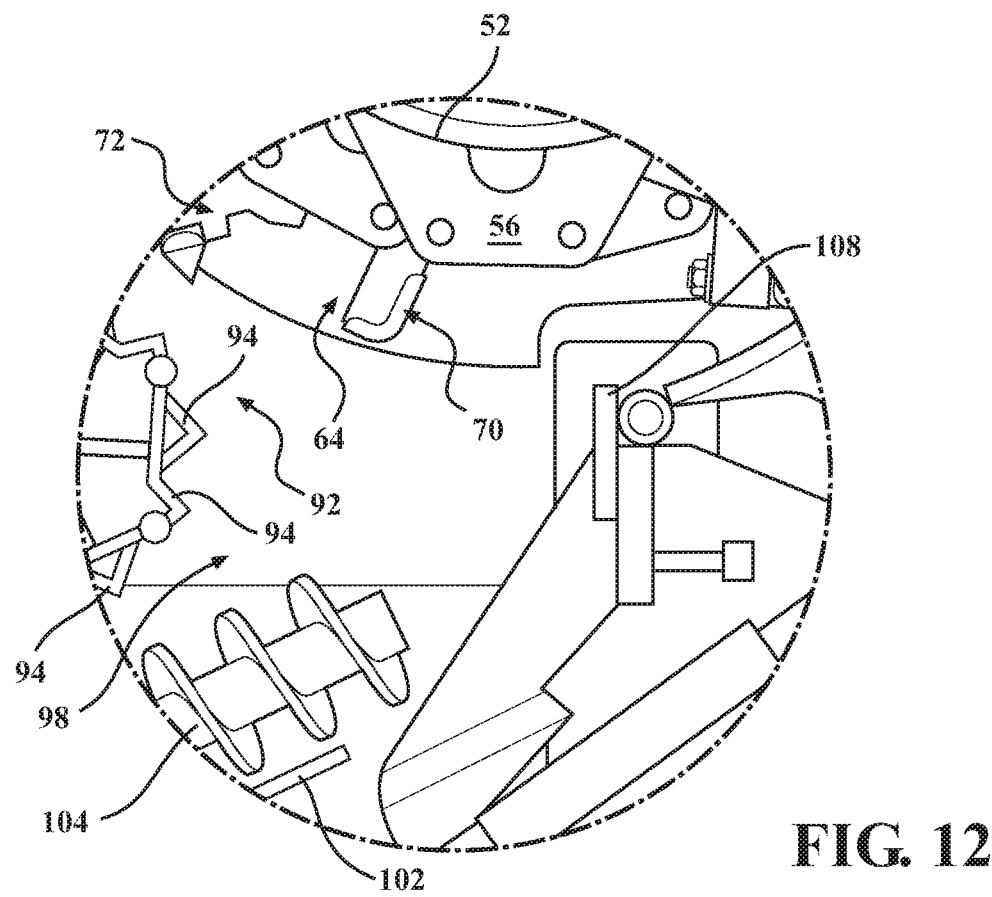
FIG. 12 is a detailed view of section 12 of FIG. 3.

In a preferred embodiment, the reducing operation comprises more than one point of material reduction, also referred to herein as a "hit point." The hit point is a point in the material reducing operation in which material reduction occurs. The first hit point comprises reducing the material with the processing tool assemblies 54 against the slats 94 as previously described. The second hit point may comprise reducing the material with the processing tool assemblies 54 against an anvil 108 positioned between the inlet area 44 and the outlet area 46. Referring to FIGS. 3 and 12, the anvil 108 provides a surface for the rotor 48 to perform the second hit point. The anvil 108 may extend substantially the width of the reducing chamber 40. The anvil 108 is preferably formed from an exposed wear member removably secured to a support member. With this structure, the wear member can be quickly and easily replaced in the result of damage by a non-reducible or as a result of wear through operation of the material processing machine 10.

After at least partial reducing at the first hit point, the reduced material is directed in the operation direction OD towards the anvil 108. The forces directing the reduced material may be provided by the laminar flow at the boundary (e.g., centripetal fluid forces), or by the leading arm 70 directly impacting previously reduced material. At least a portion of the reduced material contacts an upper portion of the anvil 108 and is furthered reduced by the processing tool assemblies 54 rotating proximate the anvil 108 at significantly high rotational speeds (i.e., revolutions per minute). At least most of the reduced material is directed along the boundary from the inlet zone 45 to the outlet zone 47 towards the screens 86a, 86b. Provided the material is reduced to a size smaller than the openings 90 of the screens 86a, 86b, the forces direct the sufficiently reduced material through the screens 86a, 86b and to the discharge conveyor 38 of the discharge system 16.

Subsequent to the first hit point, a portion of the at least partially reduced material may be disposed in a basin 98 of an auxiliary feed system 100 comprising a component of the reducing system 14. Referring to FIGS. 3 and 12, the basin 98 generally comprises an area inferior to the reducing chamber 40, or alternatively comprises a lower portion of the reducing chamber 40. The basin 98 may extend the width of the reducing chamber 40. One or more walls 102 may define the basin 98. The basin 98 may receive material that contacts a lower portion of the anvil 108 such that the material does not engage the second hit point, and/or material sufficiently unreduced from the first hit point that gravity forces the material into the basin 98. The basin 98 may also receive minimal bits of material not sufficiently reduced to pass through the screens 86a, 86b, which is directed about the boundary in the operating direction through the transition zone 49 to the inlet zone 45, and potentially further reduced at the first hit point. Regardless of origin, the material within the basin 98 accumulates during operation of the reducing system 14.

The auxiliary feed system 100 further comprise one or more augers 104 positioned inferior to the rotor 48. In a preferred embodiment, the one or more augers 104 is a plurality of augers (one shown in FIGS. 3 and 12) positioned in a side-by-side configuration across the width of the reducing chamber 40. The augers 104 may at least partially extend through the basin 98. In the exemplary embodiment illustrated in FIGS. 3 and 12, the augers 104 are oriented angularly and proximate to the wall 102 defining the basin 98. The augers 104 are powered by a motor and configured to direct material from a lower portion of the basin 98 to an upper portion of the basin 98.

With reference to FIG. 12, the auxiliary feed system 100 further comprises the anvil 108 positioned adjacent the basin 98 proximate the rotor 48. The anvil 108 is configured to facilitate a second reducing operation (as well as defining the second hit point of a first reducing operation). The accumulated material within the basin 98, directed with the rotating augers away from the lower portion of the basin 98 toward the rotor 48 rotating in the operating direction OD. Eventually, accumulated material encroaches the boundary of the rotor 48 such that it is directly impacted by one of the rotating processing tool assemblies 54. The material may be further reduced by the reducing member 64 of the processing tool 60. The anvil 108 provides a surface to constrain the material within the basin 98 to further facilitate an efficient second reducing operation. The further reduced material may be sufficiently small to pass through the openings 90 of the screens 86a, 86b, or alternatively directed around the boundary of the reducing chamber 40 to be deposited in the basin 98 for yet another reducing operation against the anvil 108. Once the material has been reduced and expelled from the reducing system 14, the discharge conveyor 32 of the discharge system 16 directs the waste products to the appropriate location for stacking, storage, shipping, or other desired processing.

The structure of the material reducing system 42 in combination with the auxiliary feed system 100 provides a system that quickly and efficiently reduces the material to the desired particle size and then discharges these particles quickly and efficiently from the reducing system 14. The system further includes means for varying the system, allowing for customization of the processing, depending upon the application. For example, the spacing between the processing tools 60 and the slats 94 and/or anvil 108 may be varied. Additionally or alternatively, the size of the screen openings 90 may be varied, and the number, selection, and arrangement of processing tool assemblies 54 may be varied depending upon the particular application.

Figure 13:
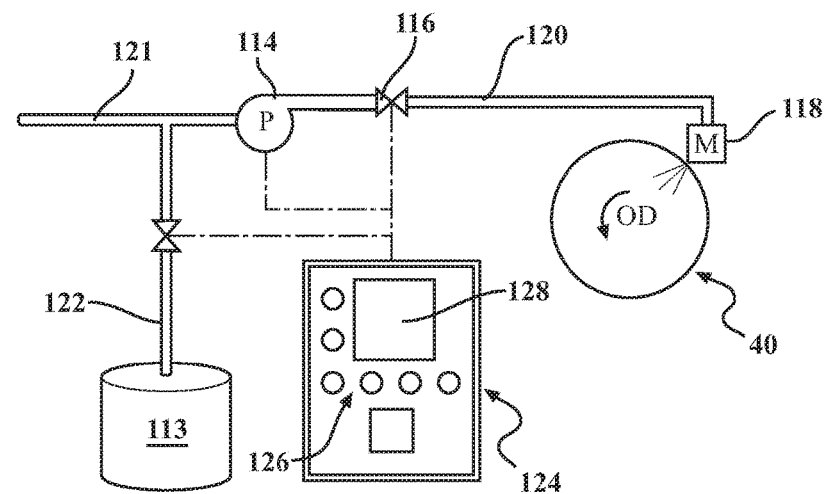
FIG. 13 is a schematic representation of a colorizer system in accordance with an exemplary embodiment of the present disclosure.

As mentioned, it may be desirable to apply a colorant to the reduced waste material for aesthetics, mold prevention, and the like. To that end, the waste processing machine 10 comprises the colorizer system 110. FIG. 13 shows a schematic representation of an exemplary colorizer system 110 comprising a colorant source 113, one or more pumps 114, one or more valves 116, and one or more manifolds 118. Lines 120, 122 couple each of the components of the system. Line 121 is provided and coupled to a fluid source, such as a water reservoir. The lines 120, 121, 122 may be flexible tubing, rigid piping, or any other suitably constructed conduit. FIG. 14 shows several components of the colorizer system 10 coupled to a movable cart-like structure positioned near and coupled to the waste processing machine 10 with one of the lines 120, 121, 122.

The colorant may be liquid, granular, or powdered, or combinations thereof. In one embodiment, the colorant source 113 is schematically represented as a tank in FIG. 13 configured to store a liquid colorant. Additionally or alternatively, the colorant source 113 may comprise a cartridge configured to store a powdered or granular colorant. The colorant source 113 may include the liquid colorant premixed from a powered colorant concentrate. Any suitable vessel may be included to store the colorant.

The pump 114 is in fluid communication with the colorant source 113 and configured to provide a positive pressure or negative pressure to direct the colorant through the colorizer system 110. The colorant may be pumped in a form substantially as stored in the colorant source 113, and/or mixed with water or another additive. For example, the line 121 in fluid communication with a water reservoir dilutes the colorant to a desired concentration from a concentrated form in the colorant source 113. One of the valves 116 may selectively provide fluid communication between the colorant source 113 and the water reservoir. In another exemplary embodiment, the colorizer system 110 comprises an additive source in selective fluid communication with the manifold 118 with the additive including a fungicide or other chemical composition(s).

The colorizer system 110 may be controlled with a controller 124. The controller may comprise a user interface 126 and an alternating current (AC) drive 128 to control the pump 114. One exemplary AC drive comprises a TECO-Westinghouse Model. No. L510 (Round Rock, Tex.). The controller 124 may further be in electronic communication with and selectively control one or more of the valves 116.

The colorant (and, if desired, the additive(s)) is directed through the lines 120, 121 to the manifold 118. An exemplary manifold 118 is shown in FIGS. 3-5 and 15. The manifold 118 comprises an elongate chamber 130 and a plurality of openings 132. The elongate chamber 130 may comprise a square or rectangular cross section, as shown, or alternatively a cylindrical, triangular, or other suitable elongate shape. The openings 132 may be arranged along a length of the elongate chamber 130, and more particularly, equally spaced along the length of the elongate chamber 130. The manifold 118 further comprises an inlet 134 configured to removably couple to one of the lines 120 of the colorizer system 110. In the exemplary embodiment illustrated in FIG. 15, the inlet 134 comprises a threaded end 136 to removably receive a counterposing threaded end of the line 120. When coupled to the line 120, the elongate chamber 130 is in fluid communication with the colorant source 113 to receive the colorant under pressure provided by the pump 114.

The manifold 118 is positioned proximate the reducing chamber 40. FIGS. 3-5 show the manifold 118 coupled to the housing 84 and positioned external to the reducing chamber 40. In particular, the manifold 118 is coupled to the barrier 84c opposite the upper recess 87. In one example, a mounting system 138 facilitates coupling the manifold 118 to the barrier 84c in a desired pose, and in a manner that facilities servicing and replacement of the manifold 118. With concurrent reference to FIG. 15, a bracket 139 is mounted to the housing 84, such as through welding or other suitable joining means. The bracket 139 may be mounted adjacent an aperture 85 to be described. The mounting system 138 includes one or more flanges 141 that are preferably mounted to the manifold 118, such as through welding or other suitable joining means. The flanges 141 include holes adapted to be aligned with complimentary holes (not shown) extending through the bracket 139. In other words, the mounting system 138 is between the manifold 118 and the bracket 139. Fasteners 151, such as bolts and the like, are inserted through the holes to releasably secure the manifold 118 to the bracket 139 with the mounting system 138, and thus to the housing 84. Preferably, the holes in the flanges 141 are threaded such that the fasteners 151 are directly secured to the threads of the flanges 141. Alternatively, or in addition to, the fasteners 151 could extend through the flanges 141 and be secured with a nut. Releasably securing the manifold 118 to the housing 84 provides ease with servicing and replacement of the manifold 118.

Figure 15:
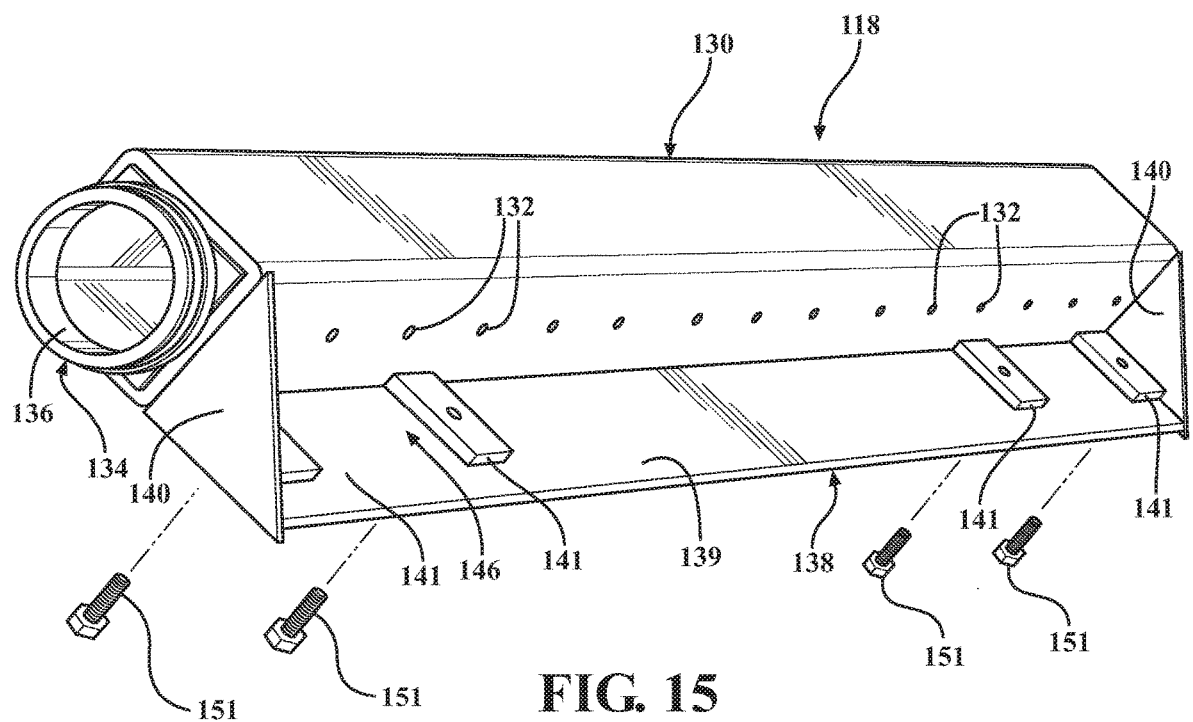
FIG. 15 is a perspective view of a manifold and a bracket in accordance with an exemplary embodiment of the present disclosure.
Figure 16:
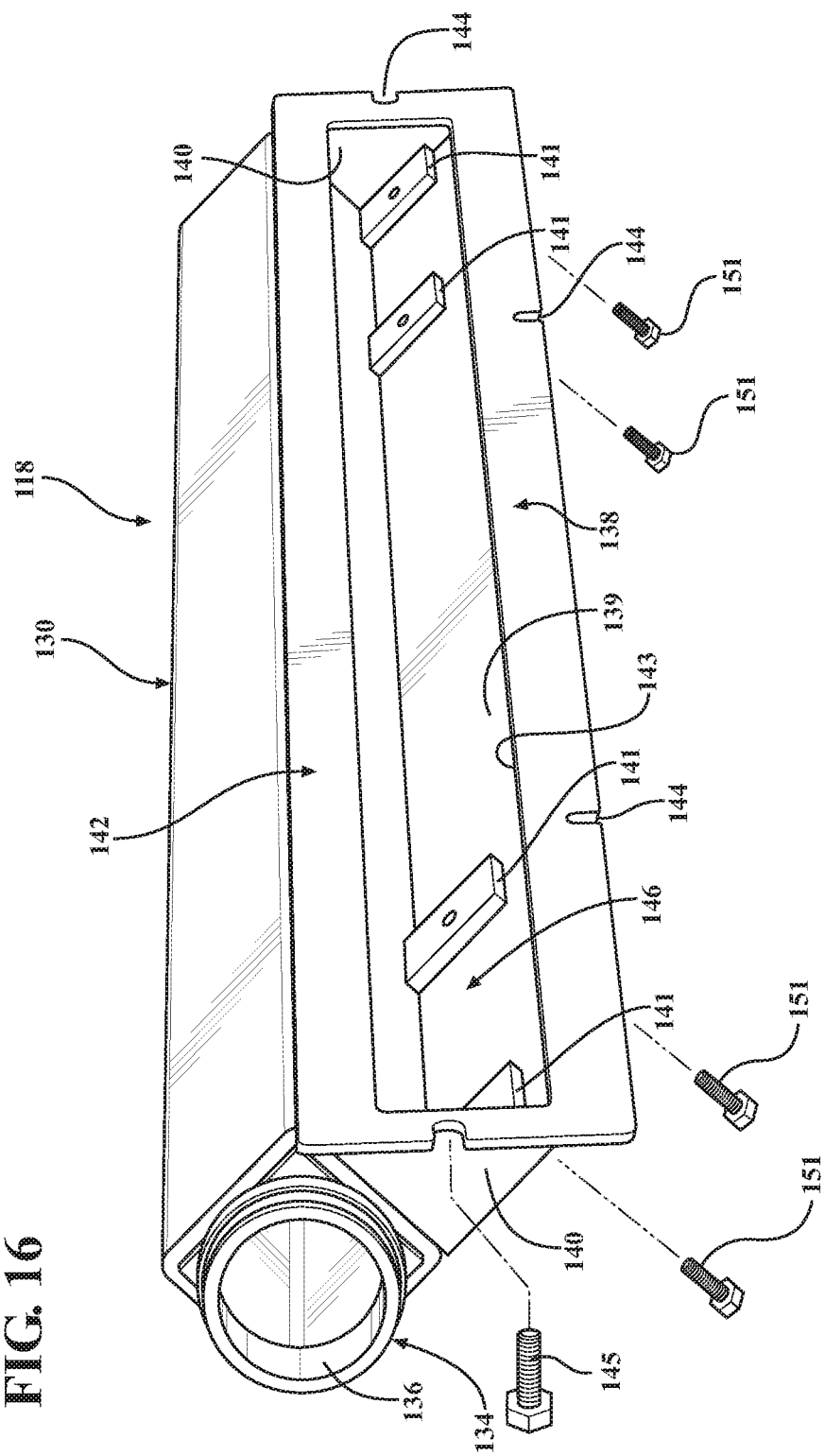
FIG. 16 is a perspective view of the manifold and the bracket of FIG. 15 with a mounting plate in accordance with an exemplary embodiment of the present disclosure.

FIG. 16 shows the mounting system 138 in accordance with another exemplary embodiment. The mounting system 138 includes the bracket 139 and the flanges 141 mounted to the manifold 118. In the manner previously described, the flanges 141 are adapted to be removably coupled to the bracket 139 with fasteners 151, thus removably securing the manifold 118 to the bracket 139. The mounting system 138 of the present embodiment further includes a mounting plate 142 between the bracket 139 and the housing 84. In particular, the bracket 139 is mounted to the mounting plate 142, such as through welding or other suitable joining means. The mounting plate 142 is generally rectangular in shape with four elongate legs defines an aperture 143. The aperture 143 substantially shaped to correspond to the aperture 85 within the housing 84 such that, when the mounting system 138 couples the manifold 118 to the housing 84, the apertures 85, 143 provide for communication between the openings 132 of the manifold 118 and the reducing chamber 40. The mounting plate 142 defines cutouts or holes 144 configured to receive a fastener 145, such as a bolt. With the mounting plate 142 positioned in an abutting relationship with the barrier 84 *c* of the housing 84, the fasteners 145 removably couple the mounting plate 142 to the barrier 84 *c*, and thus the manifold 118 is removably secured to the housing 84. Consequently, in the present embodiment of the mounting system 138, there are two options for removing the manifold 118 for servicing or replacement. First, as shown in FIG. 16, an assembly including the mounting plate 142, the bracket 139, and the manifold 118 may be removed by decoupling the fasteners 145 securing the mounting plate 142 to the housing 84. The manifold 118 could then be removed from the mounting plate 142 and bracket 139 by removing the fasteners 151. Second, as shown in FIG. 15, the manifold 118 may be removed by decoupling the fasteners 151 securing the flanges 141 to the bracket 139, as previously described.

The mounting system 138 may further include end supports 140 fixedly joined to one or both of the bracket 139 and the manifold 118. In one example, the end supports 140 are welded to the bracket 139. FIGS. 3-5 and 15-16 show the end supports 140 being triangular in shape to impart the desired pose to the manifold 118 positioned in an abutting relationship with the end supports 140. The shape of the end supports 140 further facilitates the manifold 118 directing the colorant towards the rotor 48 at the desired angle. It is also contemplated that one or more seals (not shown) may be provided at interfaces between the manifold 118, the bracket 139, the mounting plate 142, and/or the housing 84 to prevent egress of colorant being ejected from the manifold 118.

The barrier 84*c* of the housing 84 defines the aperture 85 opening into the outlet zone 47 of the reducing chamber 40. The colorant is directed from the manifold 118, through the aperture 85 and into the outlet zone 47 of the reducing chamber 40. In other words, the colorant may be ejected from the manifold 118 external to the reducing chamber 40, after which it passes through the aperture 85 and into the outlet zone 47. The manifold 118 is mounted to the bracket 139 to align to the openings 132 of the manifold 118 with the rotor 48. With the manifold 118 disposed external to the reducing chamber 40, a cavity 146 (see FIGS. 15 and 16) may be defined between the manifold 118 and the bracket 139 when the manifold 118 is coupled to the bracket 139. The cavity 146 is in communication with the reducing chamber 40. Further, disposing the manifold 118 external to the reducing chamber 40 and directing the colorant through the aperture 85 provides for, among other advantages, retrofitting existing waste material machines with the colorizer system 110. In certain embodiments, the aperture 85 within the barrier 84*c* may be an elongate slot extending across substantially an entirety of a width of the reducing chamber 40. More than one of the openings 132 of the manifold 118 are positioned to direct the colorant through the elongate slot. FIG. 5 shows all of the openings 132 of the manifold 118 are positioned to direct the colorant through the elongate slot that is rectangular in shape. The arrangement further facilitates retrofitting existing waste material machines with the colorizer system 110 without the further need of pipes, fittings, and the like, extending between the manifold 118 and the reducing chamber 40.

The manifold 118 is positioned to direct the pressurized colorant towards a portion of the material reducing system 42 and in particular the rotor 48. More specifically, the manifold 118 is positioned to direct the pressurized colorant into direct contact with the processing tool assemblies 54. As best shown FIG. 4, the manifold 118 is positioned near or within the outlet zone 47, adjacent the upper recess 87 of the reducing chamber 40, and generally above the material reducing system 42 where the rotor 48 is operating in the counterclockwise operation direction OD. In the exemplary embodiment illustrated in FIGS. 3 and 4, the openings 132 of the manifold 118 are oriented to direct the colorant towards the rotor 48. In one example, the colorant is directed towards the rotor 48 at an angle, ($\beta$, of between thirty-five and fifty-five degrees, and more particularly forty-five degrees. The angle at which the colorant is directed towards the rotor 48 may be based, at least in part, on a shape of the mounting system 138 coupling the manifold 118 to the barrier 84*c*. The bracket 139 may be oriented at an angle relative to vertical to impart a desired pose of the manifold 118. In another example, the openings 132 are aligned with the longitudinal axis L (FIG. 6) of rotor 48 such that the colorant is directed towards the same. In such an example, the colorant may contact the rotor 48 at approximately the 2 o'clock position.

With continued reference to FIG. 4, the manifold 118 and the first hit point (i.e., where the processing tool assemblies 54 reduces the material against the slats 94) are positioned generally opposite the rotor 48 such that colorant ejected from the manifold is not directly applied to the material entering the reducing chamber. As described herein, the colorant "coats" and travels with the rotor 48 in the operating direction OD, and colorizes the material substantially contemporaneous with the reducing operation. As discussed below, the material entering the reducing chamber has preferably already been reduced at least once.

In operation, colorant (possibly diluted with water and/or another additive) is directed from the colorant source 113 to the manifold 118 as previously described. The colorant is under positive pressure from the pump 114 and sprayed from the manifold 118 into the reducing chamber 40 towards the rotor 48 operating in the operating direction OD. At least a portion of the sprayed colorant may effectively coat the rotor 48, and in particular the processing tool assemblies 54, and another portion of the ejected colorant may travel along the boundary of the reducing chamber 40 due to the forces from the rotational fluid flow (i.e. liquid colorant and air) as previously described. In one exemplary embodiment, the colorant is sprayed from the manifold 118 at a flow rate in the range of 55-80 gallons per minute (GPM), and more particularly in the range of 60-65 GPM.

The colorant is directed through the transition zone 49 to the inlet zone 47, and then within the inlet zone 47 towards the inlet area 44 in the operation direction OD. The colorant effectively contacts and/or mixes with the material entering the inlet area 44 on the feed conveyor 28, thereby coloring the material. The coloring of the material occurs substantially contemporaneous with the reducing operation (i.e., the reducing member 64 of the processing tool 60 engages and reduces the material such that newly exposed surfaces of the reduced material are likewise coated with colorant). As previously described, the reduced (and now colored) material is directed through the screens 86a, 86b, if sufficiently reduced, to the discharge system 16. If the material is not sufficiently reduced, the colored and partially reduced material may accumulate in the basin 98 and ultimately undergo a third or subsequent reducing operation against the anvil 108. The second or subsequent reducing operation may also be associated with further coloring from the colorant "coating" the processing tool assemblies 54.

Based on the improved material reducing system 42 of the present disclosure, substantially an entirety of the reduced and colorized material is directed through the screens 86a, 86b. In other words, substantially an entirety of the reduced and colorized material is discharged to the discharge system 16 on a first colorizing pass alongside the screens 86a, 86b. Thus, at least substantially an entirety of the colorant is applied directly to the rotor 48, and negligible material passes the screens 86a, 86b within the outlet zone 47 such that negligible colorant is applied directly to material in the outlet zone 47.

The present disclosure contemplates improved methods for providing colorizing on the initial reducing operation such that negligible colorant is applied directly to material. One exemplary method comprises an incremental two-stage reducing operation. In a general sense, each stage of the two-stage reducing operation partially reduces the material with the colorant applied during the latter stage. The colorant may or may not be applied during the first of the two-stage reducing operation, but preferably only to the partially reduced material during the second of the two-stage reducing operation. Application of the colorant to the already partially reduced material (from the first of the two-stage reducing operation) provides improved coverage of the colorant and increases the likelihood the second of the two-stage reducing operation sufficiently reduces the material to pass through the screens 86a, 86b.

Each stage of the two-stage reducing operation will now be described in turn. During the first of the two-stage reducing operation, the fixed screen 86a comprising relatively larger openings 90 is utilized. The fixed screen 86a of FIG. 10 is one non-limiting example. The fixed screen 86a is removably secured at a suitable position about the reducing chamber 40, preferably proximate the outlet zone 47.

Unreduced material is loaded onto the feed conveyor 28 of the infeed system 12 directing the material towards the reducing system 14. The unreduced material may be substantially non-uniform at this point; i.e., the unreduced material comprises material of different types, sizes, shapes, etc. For example, in the first of the two-stage reducing operation, the unreduced material may comprise tree stumps, vegetation, branches, salvaged wood, leaves, dirt, and the like.

The reducing system 14 reduces the material as previously described herein. At this point, the colorizer system 110 is selectively inoperable such that no colorant is applied to the material being reduced in the first of the two-stage reducing operation. Based on the effectiveness of the material reducing system 42 and the relatively larger openings 90 of the fixed screen 86a, at least most of the partially reduced material is able to pass to the discharge system 16 without requiring the auxiliary feed system 100. The partially reduced material is discharged and collected through means commonly known in the art. The partially reduced material generally comprises a uniform type and size; e.g., pieces of wood all comprising a size smaller than the openings 90 of the fixed screen 86a.

The fixed screen 86a is removed, and a second fixed screen is removably secured. The second fixed screen comprises openings relatively smaller than the openings 90 of the fixed screen 86a. In one example, the second fixed screen comprises same or similarly sized openings as the openings of the movable screen 86b. The fixed screen 86a and second fixed screen may be configured to be interchangeably secured within the waste processing machine 10 with the same or similar means of attachment. In one example, the screens may be slidably removed in a direction parallel to the major axis of the rotor 48.

The partially reduced material is loaded onto the feed conveyor 28 of the infeed system 12 directing the material towards the reducing system 14. During this second of the two-stage reducing operation, the colorizer system 110 is selectively operable such that colorant is applied to the material being further reduced. Since the partially reduced material is more uniform in type and shape relative to the first of the two-stage reducing operation, the colorant is relatively more uniformly applied to the material being further reduced. Furthermore, the material reducing system 42 sufficiently reduces the colorized material to pass through the relatively smaller openings of the second fixed screen with negligible utilization of the auxiliary feed system 100.

The incremental reduction of the material in each of the two-stage reducing operation is associated with several advantages. Nearly all of the material passes through the fixed screen 86a (and/or the fixed and moving screens 86a, 86b) during each of the two stages, thereby minimizing material accumulation within the reducing chamber 40 and avoiding application of the colorant directly to the reduced material in the outlet zone 47. Positioning the manifold 118 within the outlet zone 47 and directing the colorant towards the rotor 48 is associated with improved coverage of the colorant on the reduced material relative to known systems that apply the colorant to a "cloud" of suspended material within the chamber. Second, the incremental reduction of material provides substantially uniform colorized material of any desired size based on the interchangeable fixed screens comprising openings of desired shapes and/or sizes.

Third, because the colorant is directed towards the rotor 48 (and not the material itself), the manifold 118 may comprise a simplified design relative to known colorizer systems. Known systems require complex processes to control the amount and type of colorant ejected from each of one or more openings and/or multiple manifolds in an attempt to achieve uniform application. The exemplary manifold 118 described herein comprises a singular inlet 134 in fluid communication with the plurality of openings 90. The colorant received under pressure from the colorant source 113 may be sprayed through all of the openings 90 at substantially the same pressure towards the rotor 48, thereby greatly reducing complexity of the colorizer system 110. The design of the reducing chamber 40 and the efficiency of the material reducing system 42 provides the desired uniform reduction and colorization as previously described. Other advantages are readily appreciated to those having skill in the art.

Furthermore, the present disclosure contemplates that the exemplary methods may comprise fewer or greater stages than the two-stage reducing operation described herein. For example, should the waste material received be a partially or substantially uniform, a user may opt to utilize a fixed screen with relatively smaller openings with the colorizer system 110 operable. For another example, a user may opt to incrementally reduce the material several times before colorizing the reduced material. The two-stage reducing operation described here is but one non-limiting example.

Because of the reduced complexity of the colorizer system 110, the system may be retrofit or otherwise installed on existing waste processing machines. The manifold 118 may be mounted adjacent the reducing chamber 40 as best shown in FIG. 4. As mentioned, the manifold 118 may be mounted to the barrier 84c opposite the upper recess 87 and the barrier 84c comprising the aperture 85 through which the ejected colorant passes to enter the reducing chamber 40. Disposing the manifold 118 external to the reducing chamber 40 may prevent wear through the material and other non-reducible debris moving chaotically within the reducing chamber 40 during operation of the waste processing machine 10. The present disclosure contemplates the manifold 118 may be mounted to any suitable structure at any suitable location.

Several of the components of the colorizer system 110 may be disposed remote from the waste processing machine 10 and removably coupled prior to operation. For example, the colorant source 113, the additive source, the pump(s) 114, and/or the valve(s) 116 may be disposed on a movable cart-like structure, as shown in FIGS. 1 and 14. When the colorizer system 110 is intended to be operable, the cart is positioned adjacent the waste processing machine 10 and one of the lines 120 (e.g., a flexible hose) is coupled to the threaded end 136 at the inlet 134 of the manifold 118. The electric and electronic components of the colorizer system 110 are electrically coupled to a power source (e.g., on the waste processing machine 10 or externally). The embodiment of the colorizer system 110 disposed on a cart provides modularity of the system and quick coupling and decoupling from the waste processing machine 10. Additionally or alternatively, the present disclosure contemplates that the colorizer system 110 may be fully integrated with the waste processing machine 10. More specifically, the colorant source 113, the additive source, the pump(s) 114, and/or the valve(s) 116 may be disposed on the frame 22 at any suitable location and mounted in any suitable manner. Those having skill in the art readily appreciate that the colorizer system 110 of the present disclosure may be incorporated into the waste processing machine 10 in other similarly advantageous manners.

Examples of material processing machines are disclosed in: U.S. Pat. No. 6,047,912, issued Apr. 11, 2000, entitled "Break-Away Processing Tool For A Waste Processing Machine"; U.S. Pat. Nos. 5,863,003 and 6,299,082; issued Jan. 26, 1999 and Oct. 9, 2001, respectively; all to Smith; and entitled "Waste Processing Machine"; U.S. Pat. No. 6,059,210 issued May 9, 2000 to Smith, entitled "Rotor Assembly For A Waste Processing Machine"; U.S. Pat. No. 6,517,020, issued Feb. 11, 2003 to Smith, entitled "Replaceable Raker Assembly For Processing Tool Of Waste Processing Machine"; U.S. Pat. No. 6,299,082, issued Oct. 9, 2001 to Smith, entitled "Waste Processing Machine"; U.S. Pat. Nos. 6,845,931, 7,121,485, 7,384,011, and 7,726,594; issued Jan. 25, 2005, Oct. 17, 2006, Jun. 10, 2008, and Jun. 1, 2010, respectively; all to Smith; and entitled "Multi-Functional Tool Assembly For Processing Tool of Waste Processing Machine"; and U.S. Pat. No. 7,163,166, issued Jan. 16, 2007 to Smith, entitled "Rotatable Assembly For Machines", all of which are incorporated herein by reference in their entirety.

Other examples of such material processing machines are disclosed in U.S. Pat. No. 6,032,707, issued Mar. 7, 2000 to Morey et al., entitled "Drum Assembly For A Wood Chipper"; U.S. Pat. No. 6,036,125, issued Mar. 14, 2000 to Morey et al., entitled "Wood Chipper"; U.S. Pat. No. 5,988,539, issued Nov. 23, 1999 to Morey, entitled "Wood Chipper With Infeed Chute Safety Device"; U.S. Pat. No. 6,000,642, issued Dec. 14, 1999 to Morey, entitled "Wood Chipper With Infeed Chute Safety Device"; U.S. Pat. No. 6,722,596, issued Apr. 20, 2004 to Morey, entitled "Multiple Wheel Feed Wheel Assembly For A Wood Chipper"; U.S. Pat. No. 6,357,684, issued Mar. 19, 2002 to Morey, entitled "Adjustable Tension Feed Wheel Assembly For A Wood Chipper"; U.S. Pat. No. 6,830,204, issued Dec. 14, 2004 to Morey, entitled "Reversing Automatic Feed Wheel Assembly For A Wood Chipper"; U.S. Pat. No. 6,814,320, issued Nov. 9, 2004 to Morey et al., entitled "Reversing Automatic Feed Wheel Assembly For Wood Chipper", all of which are incorporated herein by reference in their entirety.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A material processing machine for reducing and colorizing waste material, said material processing machine comprising:
   a frame;
   an infeed system supported by said frame defining a material processing axis along a direction that the material is fed;
   a discharge system supported by said frame and spaced from said infeed system;
   a housing supported by said frame between said infeed and discharge systems with said housing defining a reducing chamber along said material processing axis, and with said reducing chamber in turn defining an inlet zone adapted to receive the waste material from said infeed system, and an outlet zone spaced from said inlet zone adapted to direct reduced, colored, waste material to said discharge system, and a transition zone between said inlet and outlet zones, and wherein said reducing chamber defines an upper recess extending across the inlet zone and the outlet zone;

a rotor having a shaft rotatably supported by said frame within said reducing chamber with said shaft defining a longitudinal axis extending transverse to said material processing axis and also defining a vertical plane perpendicular to said material processing axis;

wherein said transition zone defines a pair of transition planes parallel to said vertical plane with one of said transition planes separating said inlet zone from said transition zone, and the other of said transition planes separating said outline zone from said transition zone;

wherein said shaft is disposed entirely within said transition zone between said transition planes;

wherein said rotor intersects said transition planes to be partially disposed within said inlet, said transition, and said outlet zones for rotating during a material reducing operation, and;

wherein said rotor has a plurality of processing tools adapted to reduce the waste material within said inlet zone and said transition zone during said material reducing operation;

at least one screen coupled to said housing in said outlet zone with said screen separating said reducing chamber and said discharge system; and a colorizer system having a pump and a manifold, said manifold comprising an inlet in fluid communication with said pump for directing a colorant through said manifold, and said manifold mounted to said housing and entirely within said outlet zone and radially adjacent to said at least one screen around said longitudinal axis of said rotor and adjacent to said upper recess, said manifold comprising an elongate chamber and having openings arranged along a length of said elongate chamber and oriented to direct the colorant directly onto said rotor within said outlet zone such that rotation in an operating direction rotates said rotor through said transition zone with the colorant disposed thereon, and provides for substantially contemporaneous reducing of the waste material within said inlet zone and said transition zone and colorizing of the waste material within at least said inlet zone with the colorized, reduced waste material passing through said at least one screen to said discharge system.

2. The material processing machine of claim 1, wherein said manifold is positioned external to said reducing chamber.

3. The material processing machine of claim 2, wherein said housing defines an aperture into said outlet zone of said reducing chamber with said openings of said manifold oriented for directing the colorant through said aperture directly onto said rotor within said outlet zone.

4. The material processing machine of claim 3, wherein said aperture within said housing is an elongate slot extending across substantially an entirety of a width of said reducing chamber.

5. The material processing machine of claim 3, further comprising a bracket mounted to said housing adjacent said aperture with said manifold coupled to said bracket to align said openings of said manifold with said rotor.

6. The material processing machine of claim 5, further comprising a mounting system between said manifold and said bracket.

7. The material processing machine of claim 6, wherein said mounting system further comprises a plurality of flanges mounted to said manifold and a plurality of fasteners to removably couple said flanges to said bracket.

8. The material processing machine of claim 5, wherein said bracket is angled relative to a vertical.

9. The material processing machine of claim 5, wherein a cavity is defined between said manifold and said bracket and external to said reducing chamber when said manifold is coupled to said bracket with said cavity in communication with said reducing chamber through said aperture.

10. The material processing machine of claim 2, further comprising a mounting system between said manifold and one of said housing and a bracket mounted to said housing.

11. The material processing machine of claim 10, wherein said mounting system further comprises a mounting plate removably coupled to said housing with said bracket mounted to said mounting plate.

12. The material processing machine of claim 3, wherein said housing comprises at least two barriers angled relative to one another to define said upper recess above said rotor.

13. The material processing machine of claim 12, wherein a portion of said upper recess is within said outlet zone with said aperture opening into said portion of said upper recess.

14. A material processing machine for reducing and colorizing waste material with said material processing machine comprising:

a frame;

an infeed system comprising a plurality of slats and supported by said frame defining a material processing axis along a direction that the material is fed;

a discharge system supported by said frame and spaced from said infeed system;

a housing supported by said frame between said infeed and discharge systems with said housing defining a reducing chamber along said material processing axis, and with said reducing chamber in turn defining an inlet zone adapted to receive the waste material from said infeed system, and an outlet zone spaced from said inlet zone adapted to direct reduced, colored, waste material to said discharge system, and a transition zone between said inlet and outlet zones, wherein said housing further defines an aperture into said outlet zone of said reducing chamber;

a rotor having a shaft rotatably supported by said frame within said reducing chamber with said shaft defining a longitudinal axis extending transverse to said material processing axis and also defining a vertical plane perpendicular to said material processing axis;

wherein said transition zone defines a pair of transition planes parallel to said vertical plane with one of said transition planes separating said inlet zone from said transition zone, and the other of said transition planes separating said outline zone from said transition zone;

wherein said shaft is disposed entirely within said transition zone between said transition planes;

wherein said rotor intersects said transition planes to be partially disposed within said inlet, said transition, and outlet zones for rotating during a material reducing operation, and;

wherein said rotor has a plurality of processing tools adapted to reduce the waste material within said inlet zone and said transition zone during said material reducing operation, said plurality of processing tools reduce the waste against at least one of said slats defining a first hit point; and a colorizer system comprising a manifold coupled to said housing, said manifold positioned external to said reducing chamber entirely within said outlet zone and said manifold is positioned opposite said first hit point about said rotor, said manifold comprising an inlet adapted to be coupled in fluid communication with a colorant source and a pump for directing colorant through said manifold, and said manifold comprising an elongate chamber and having openings arranged along a length of said elongate chamber and oriented to direct the colorant from said openings and through said aperture in a direction of said rotor within said outlet zone such that rotation in an operating direction rotates said rotor through said transition zone with the colorant disposed thereon, and provides for substantially contemporaneous reducing of the waste material within said inlet zone and said transition zone and colorizing of the waste material within at least said inlet zone with the reduced, colorized waste material passing through to said discharge system.

15. The material processing machine of claim 14, wherein said aperture within said housing is an elongate slot extending across substantially an entirety of a width of said reducing chamber.

16. The material processing machine of claim 15, wherein said manifold further comprises an elongate chamber with said openings equally spaced along a length of said elongate chamber.

17. The material processing machine of claim 16, wherein said elongate chamber is square in cross section.

* * * * *